US012050658B2

(12) United States Patent
Mishra et al.

(10) Patent No.: US 12,050,658 B2
(45) Date of Patent: Jul. 30, 2024

(54) SEARCH QUERY GENERATION BASED UPON RECEIVED TEXT

(71) Applicant: Verizon Media Inc., New York, NY (US)

(72) Inventors: Shaunak Mishra, Jersey City, NJ (US); Maxim Ivanovich Sviridenko, New York, NY (US); Mikhail Kuznetsov, Hoboken, NJ (US); Gaurav Srivastava, San Francisco, CA (US)

(73) Assignee: Yahoo Assets LLC, New York, NY (US)

( * ) Notice: Subject to any disclaimer, the term of this patent is extended or adjusted under 35 U.S.C. 154(b) by 226 days.

(21) Appl. No.: 17/398,333

(22) Filed: Aug. 10, 2021

(65) Prior Publication Data

US 2023/0048742 A1 Feb. 16, 2023

(51) Int. Cl.
| | |
|---|---|
| *G06F 16/00* | (2019.01) |
| *G06F 16/9538* | (2019.01) |
| *G06F 18/22* | (2023.01) |
| *G06F 40/30* | (2020.01) |
| *G06F 40/51* | (2020.01) |
| *G06V 30/413* | (2022.01) |
| *G06F 16/951* | (2019.01) |

(52) U.S. Cl.
CPC .......... *G06F 16/9538* (2019.01); *G06F 18/22* (2023.01); *G06F 40/30* (2020.01); *G06F 40/51* (2020.01); *G06V 30/413* (2022.01); *G06F 16/951* (2019.01)

(58) Field of Classification Search
CPC ........ G06F 16/951; G06F 40/51; G06F 40/30; G06F 18/22; G06F 16/9538; G06F 16/50; G06V 30/413
See application file for complete search history.

(56) References Cited

U.S. PATENT DOCUMENTS

| | | | |
|---|---|---|---|
| 8,990,199 B1* | 3/2015 | Ramesh ................ | G06F 16/951 707/740 |
| 10,459,970 B2* | 10/2019 | Zhu ...................... | G06F 16/9535 |
| 10,860,898 B2* | 12/2020 | Yang ..................... | G06N 3/084 |
| 10,949,907 B1* | 3/2021 | Jain ......................... | G06N 3/08 |
| 11,257,049 B1* | 2/2022 | Durazo Almeida . | G06V 30/413 |
| 2015/0339754 A1* | 11/2015 | Bloem ................ | G06F 16/9535 705/26.7 |
| 2016/0180389 A1* | 6/2016 | Kotas ................. | G06Q 30/0255 705/14.54 |
| 2017/0255693 A1* | 9/2017 | Trifunovic .......... | G06F 16/5866 |

(Continued)

*Primary Examiner* — Leslie Wong
(74) *Attorney, Agent, or Firm* — Cooper Legal Group LLC

(57) ABSTRACT

In an example, a first set of text may be received from a client device. A set of content items may be selected from among content items based upon the first set of text and a plurality of sets of content item text associated with the content items. A set of terms may be determined based upon the first set of text and the set of content items. A similarity profile associated with the set of terms may be generated. The similarity profile is indicative of similarity scores associated with similarities between terms of the set of terms. Relevance scores associated with the set of terms may be determined based upon the similarity profile. One or more search terms may be selected from among the set of terms based upon the relevance scores. A search may be performed based upon the one or more search terms.

20 Claims, 13 Drawing Sheets

(56) References Cited

U.S. PATENT DOCUMENTS

| | | | |
|---|---|---|---|
| 2018/0060359 A1* | 3/2018 | Li | G06F 16/5866 |
| 2019/0080207 A1* | 3/2019 | Chang | G06F 16/7837 |
| 2020/0250537 A1* | 8/2020 | Li | G06F 18/2148 |
| 2022/0318296 A1* | 10/2022 | Vang | G06F 16/5854 |
| 2022/0365986 A1* | 11/2022 | Lu | G06F 3/04845 |

* cited by examiner

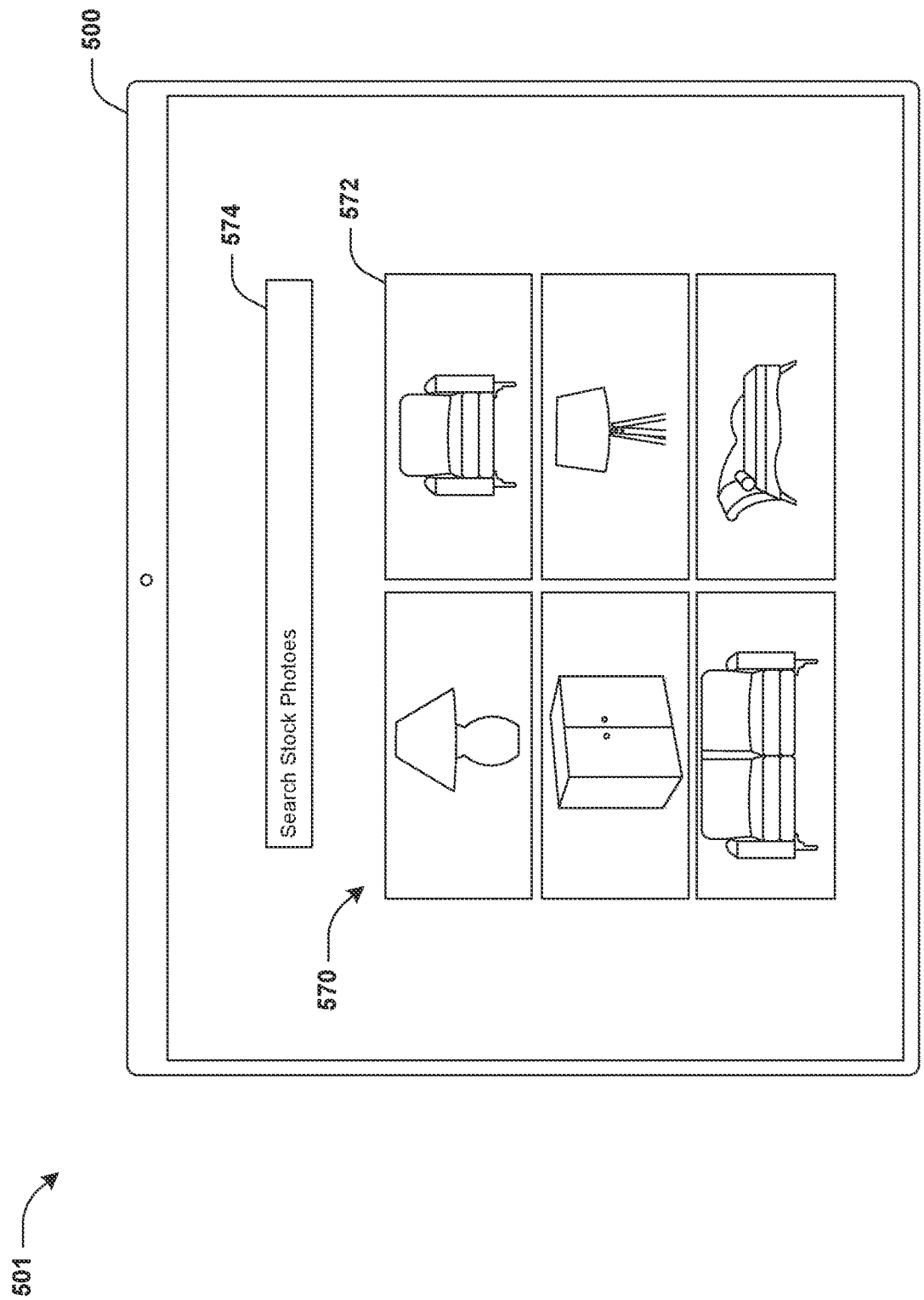

SEARCH QUERY GENERATION BASED UPON RECEIVED TEXT

BACKGROUND

Many services, such as websites, applications, etc. may provide platforms for performing searches. For example, a user may interact with an interface that provides search results related to a search query. The search results may include web pages, images, videos, etc.

SUMMARY

In accordance with the present disclosure, one or more computing devices and/or methods are provided. In an example, a content item interface may be displayed via a client device. A first set of content item text may be received via the content item interface. A set of content items may be selected from among a plurality of content items based upon the first set of content item text and a plurality of sets of content item text associated with the plurality of content items. A set of terms may be determined based upon the first set of content item text and the set of content items. A similarity profile associated with the set of terms may be generated. The similarity profile is indicative of similarity scores associated with similarities between terms of the set of terms. Relevance scores associated with the set of terms may be determined based upon the similarity profile. One or more search terms may be selected from among the set of terms based upon the relevance scores. An image search may be performed using an image database based upon the one or more search terms.

In an example, a first set of text may be received from a client device. A set of content items may be selected from among a plurality of content items based upon the first set of text and a plurality of sets of content item text associated with the plurality of content items. A set of terms may be determined based upon the first set of text and the set of content items. A similarity profile associated with the set of terms may be generated. The similarity profile is indicative of similarity scores associated with similarities between terms of the set of terms. Relevance scores associated with the set of terms may be determined based upon the similarity profile. One or more search terms may be selected from among the set of terms based upon the relevance scores. A search may be performed based upon the one or more search terms.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5G is a component block diagram illustrating an example system for generating a search query based upon received text and/or performing a search based upon the search query, where a set of search results are displayed.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
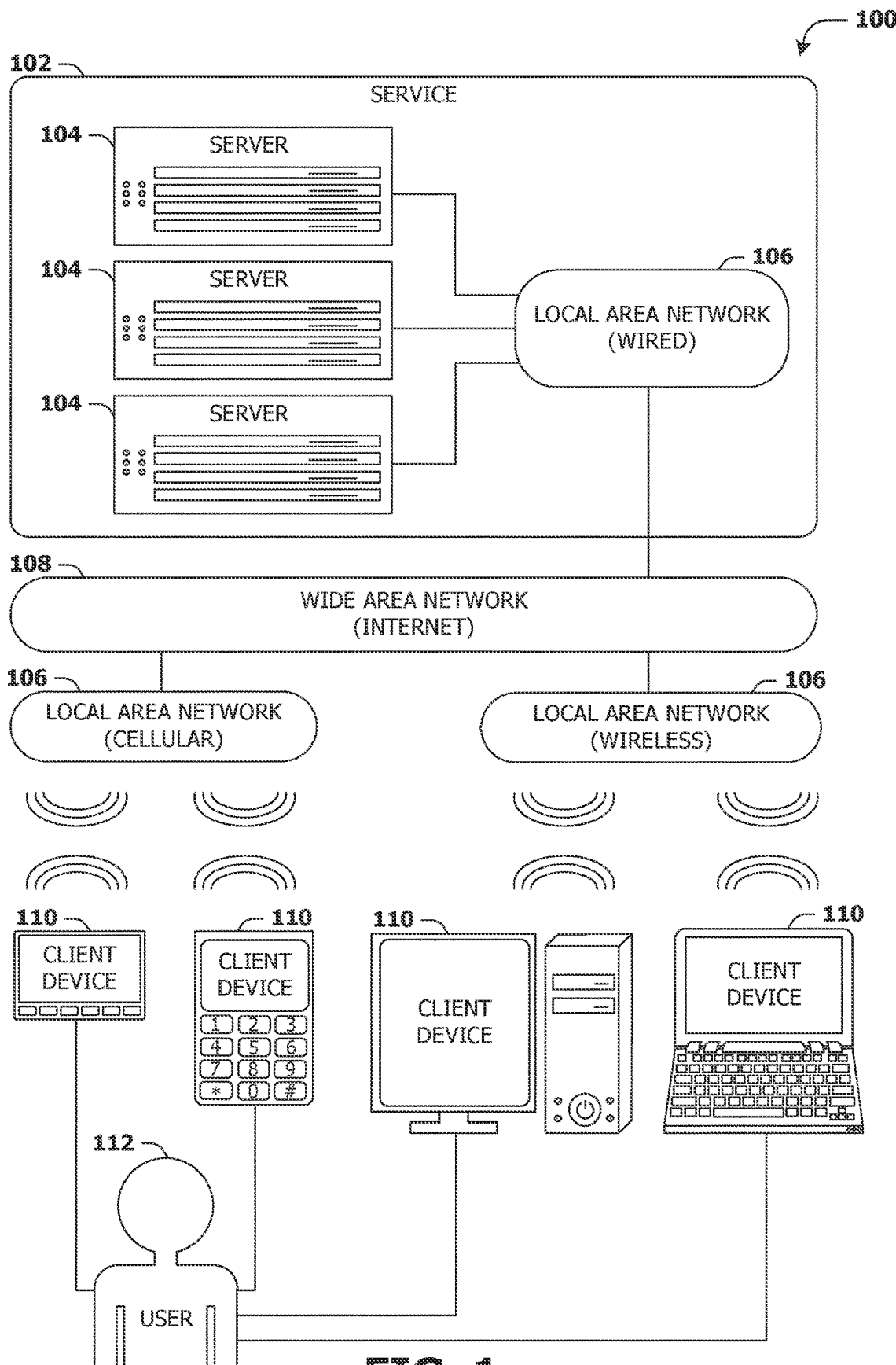
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
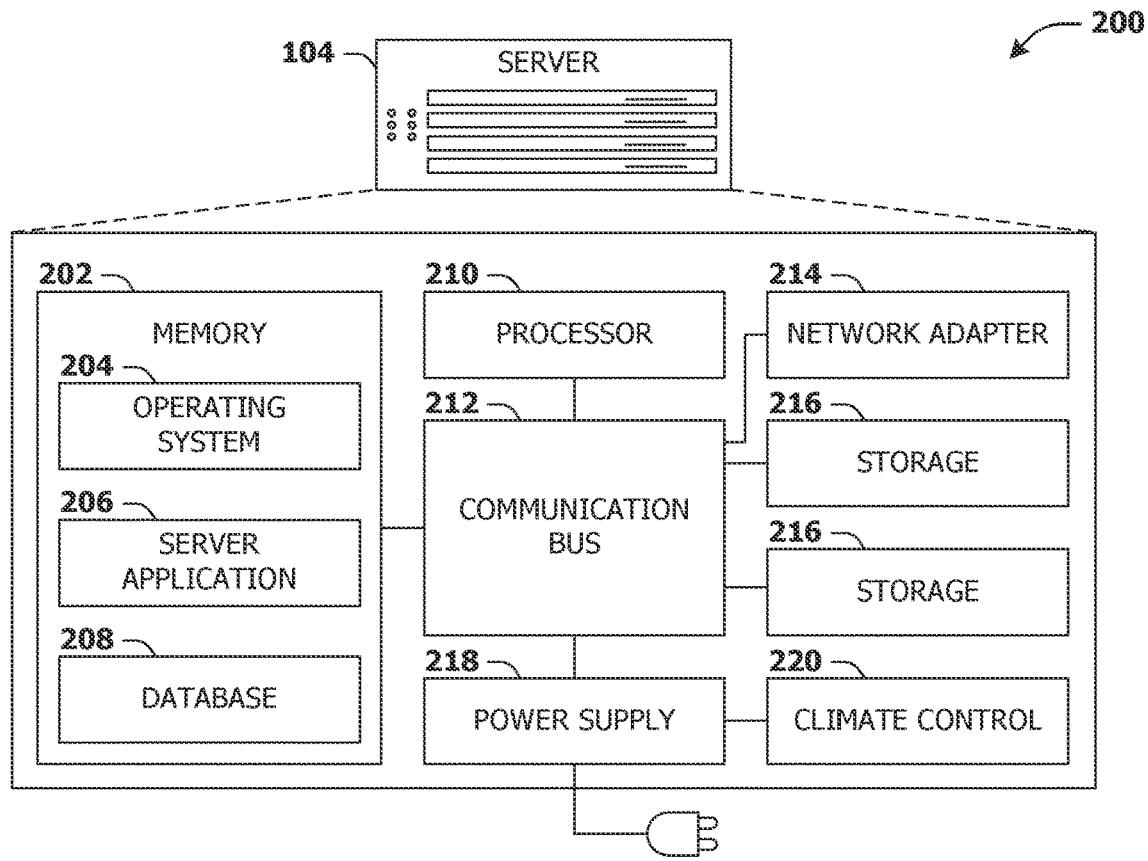
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
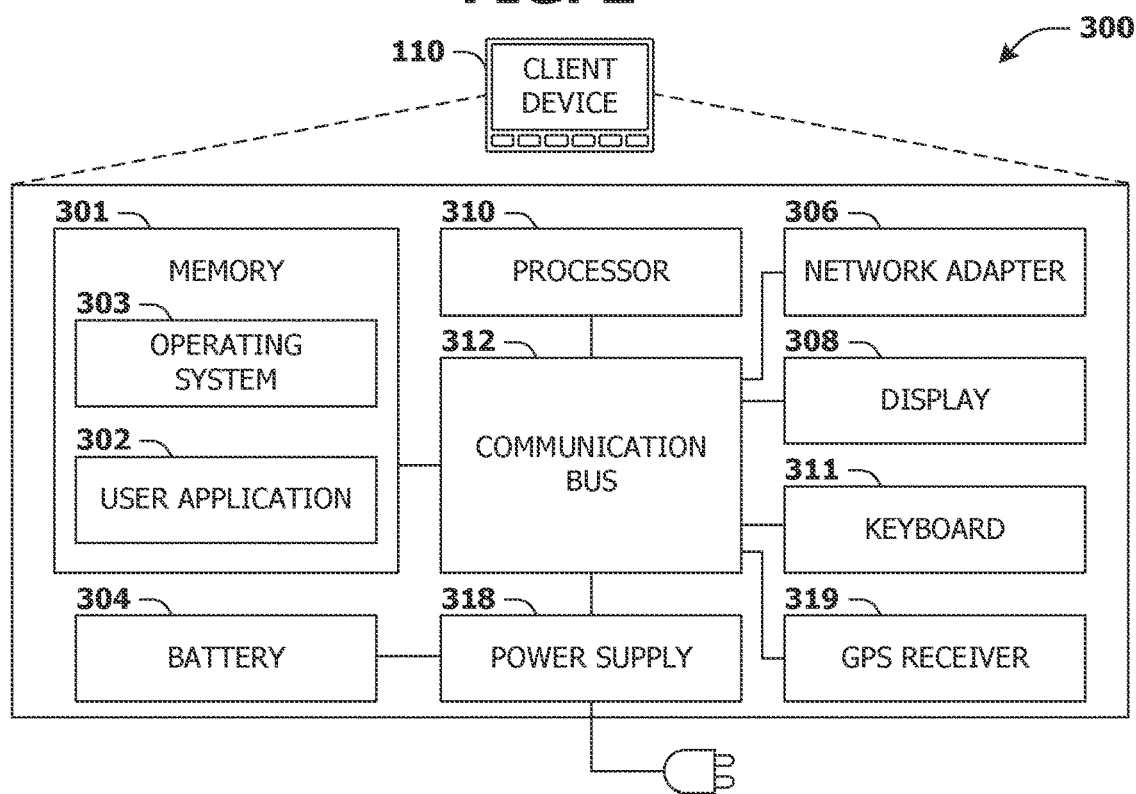
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating a search query based upon received text and/or performing a search based upon the search query are provided. For example, a user (and/or a device associated with the user) may access and/or interact with a service, such as a browser, software, a website, an application, an operating system, etc. that provides a platform for inputting content item text, selecting an image and/or generating a content item based upon the content item text and the image. However, finding a suitable image for inclusion in the content item may be difficult. Thus, one or more techniques are provided herein for generating a search query based upon the content item text. For example, a set of content items (determined to be similar to the content item text, for example) may be identified. A plurality of terms may be determined based upon the content item text and the set of content items. For example, the plurality of terms may comprise terms from the content item text and additional terms from the set of content items. For example, the additional terms may comprise text-based terms from text of the set of content items and/or image-based terms from images of the set of content items. A similarity profile associated with the plurality of terms may be generated. One or more search terms may be selected from the plurality of terms based upon the similarity profile. An image search query may be generated based upon the one or more search terms and an image search may be performed based upon the image search query.

In some embodiments, by determining and using the additional terms (e.g., image-based terms and/or text-based terms) from the set of content items to generate the image search query, the image search query may be generated with increased accuracy. The increased accuracy may be a result of the additional terms providing for an increased quantity of related terms based upon which the image search query is generated. Further, by determining and using the additional terms, the image search query may be generated (e.g., accurately generated), even in scenarios in which the content item text does not have a sufficient amount of terms for generating the image search query.

Figure 4:
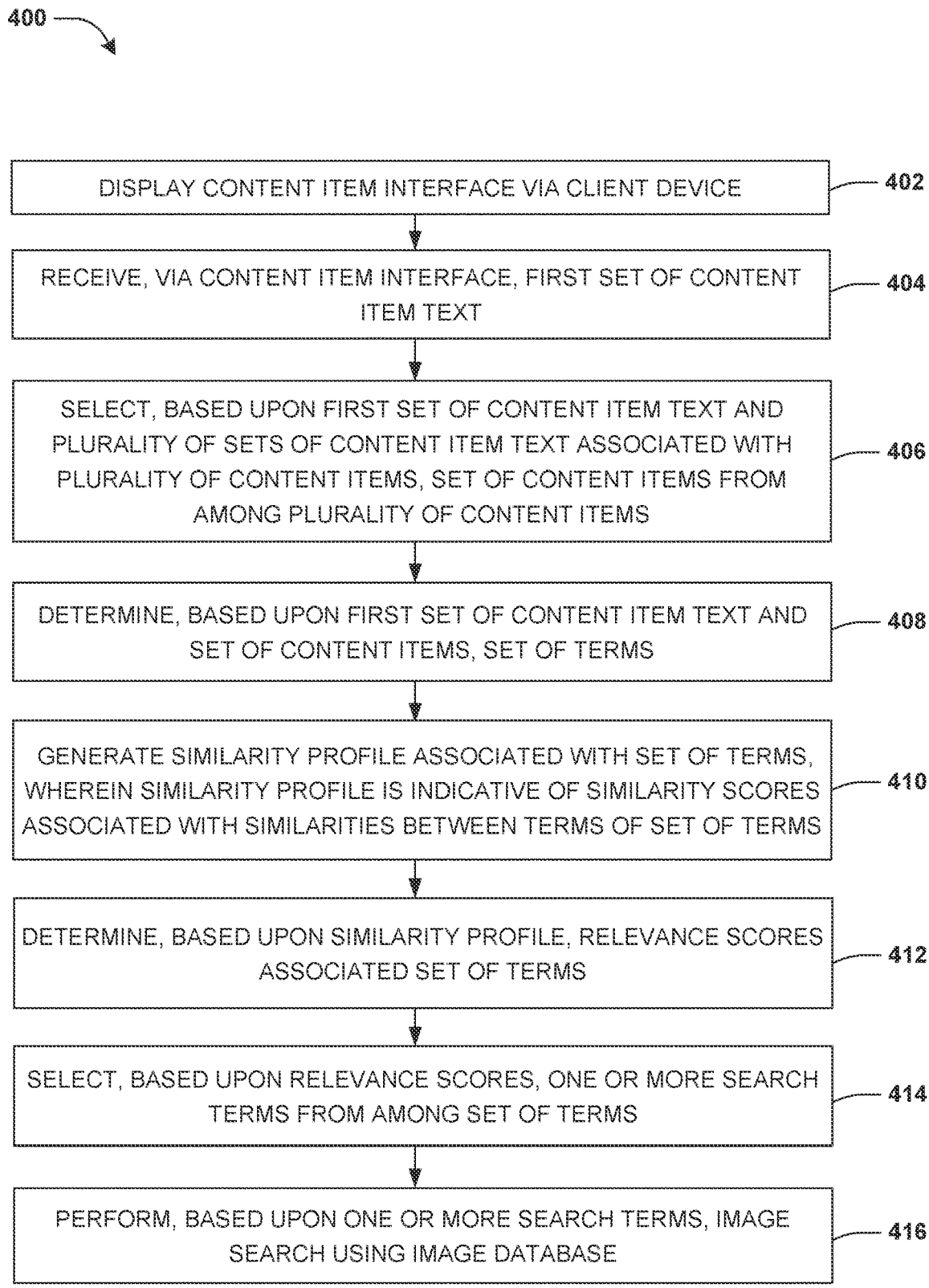
FIG. 4 is a flow chart illustrating an example method for generating a search query based upon received text and/or performing a search based upon the search query.

An embodiment of generating a search query based upon received text and/or performing a search based upon the search query is illustrated by an example method 400 of FIG. 4. A content system for generating content and/or presenting content via devices may be provided. In some examples, the content system may be an advertisement system (e.g., an online advertising system). Alternatively and/or additionally, the content system may not be an advertisement system. In some examples, the content system may provide content items (e.g., advertisements, images, links, videos, etc.) to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to consume and/or interact with the content item before the user can access content of a web page, utilize resources of an application and/or play a game.

At 402, a content item interface (e.g., a content item creation interface) may be displayed via a first client device. The content item interface may be used by at least one of a user, a publisher, a content creator, an advertiser, a company, a brand, etc. to design and/or generate a content item. In some examples, one or more images and/or content item text for inclusion in the content item may be selected and/or input via the content item interface. Other information (in addition to the one or more images and/or the content item text) may be input via the content item interface, such as at least one of sizing information (e.g., a size and/or dimensions of the content item to be generated), an advertiser identifier (e.g., identification of the advertiser), a content item category (e.g., an advertisement category of the content item to be generated), etc. In an example, the content item may be generated based upon the one or more images, the content item text and/or the other information.

Figure 5A:
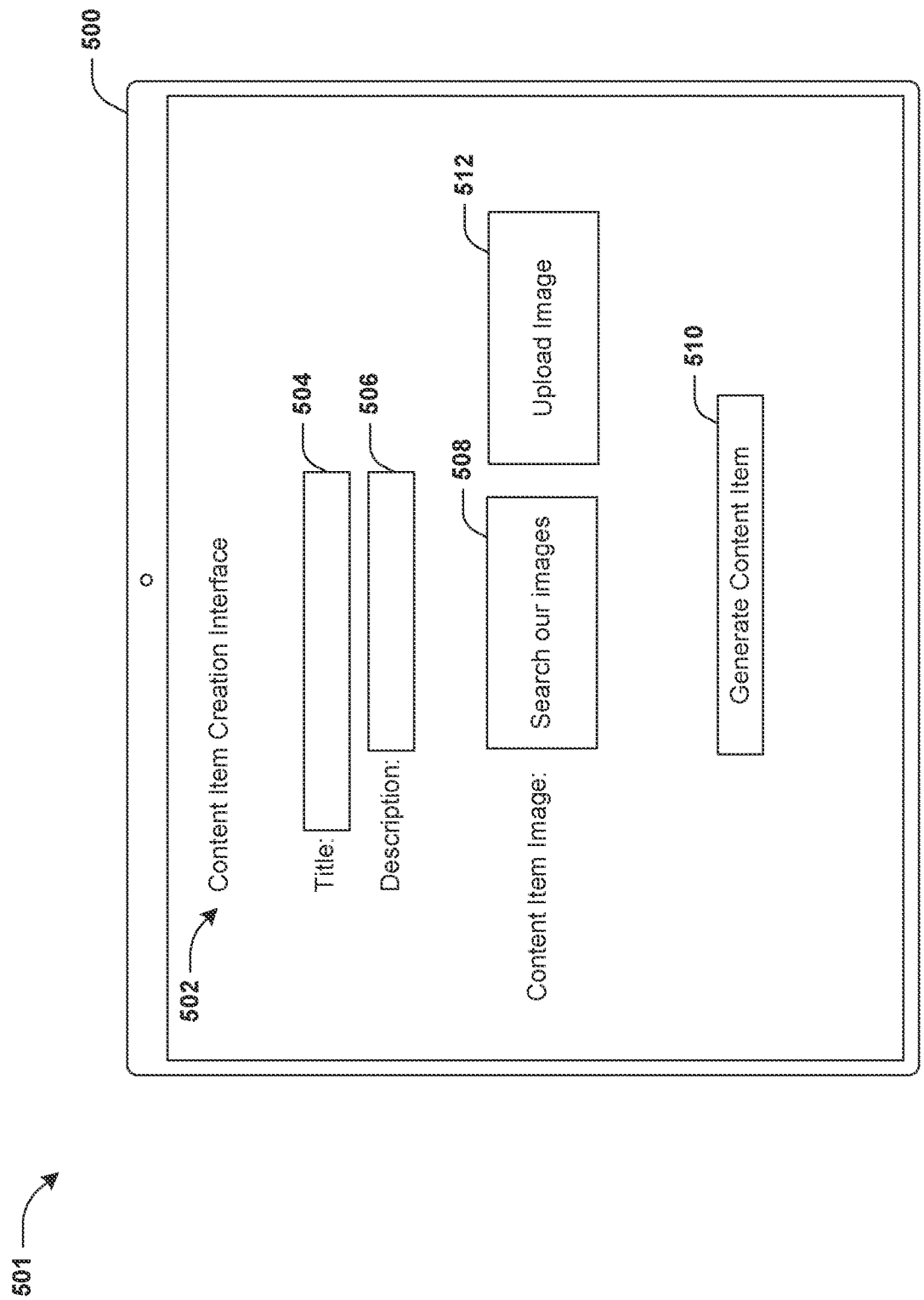
FIG. 5A is a component block diagram illustrating an example system for generating a search query based upon received text and/or performing a search based upon the search query, where a content item interface is displayed via a first client device.

FIGS. 5A-5I illustrate examples of a system 501 for generating a search query based upon received text and/or performing a search based upon the search query, described with respect to the method 400 of FIG. 4. FIG. 5A illustrates the content item interface (shown with reference number 502) being displayed via the first client device (shown with reference number 500).

The content item interface 502 may comprise one or more input text fields for inputting content item text. For example, the content item interface 502 may comprise at least one of a title input field 504 for inputting text corresponding to a title (e.g., a title of a content item, such as an advertisement title), a description input field 506 for inputting text corresponding to a description (e.g., a description of a content item, such as an advertisement description), a call to action input field (not shown) for inputting text corresponding to a call to action, etc. In some examples, the content item interface 502 may have auto-complete functionality such that in response to text being input to an input field of the one or more input text fields, one or more suggested text completion options may be displayed (e.g., a suggested text completion option may be accepted in response to a selection of the suggested text completion option).

In some examples, the content item interface 502 may comprise one or more selectable inputs associated with selecting and/or uploading an image. For example, the content item interface 502 may comprise a selectable input 508 "Search our images" associated with performing an image search to generate search results, where an image may be selected, from the search results, for inclusion in a content item. Alternatively and/or additionally, the content item interface 502 may comprise a selectable input 512 associated with uploading an image for inclusion in a content item.

In some examples, the content item interface 502 may comprise a selectable input 510 (e.g., a selectable button) associated with generating a content item. For example, in response to a selection of the selectable input 510, a content item may be generated based upon content item text (received via the content item interface 502, for example), an image (e.g., selected and/or received via the content item interface 502, for example), sizing information (selected and/or received via the content item interface 502, for example), etc.

Figure 5B:
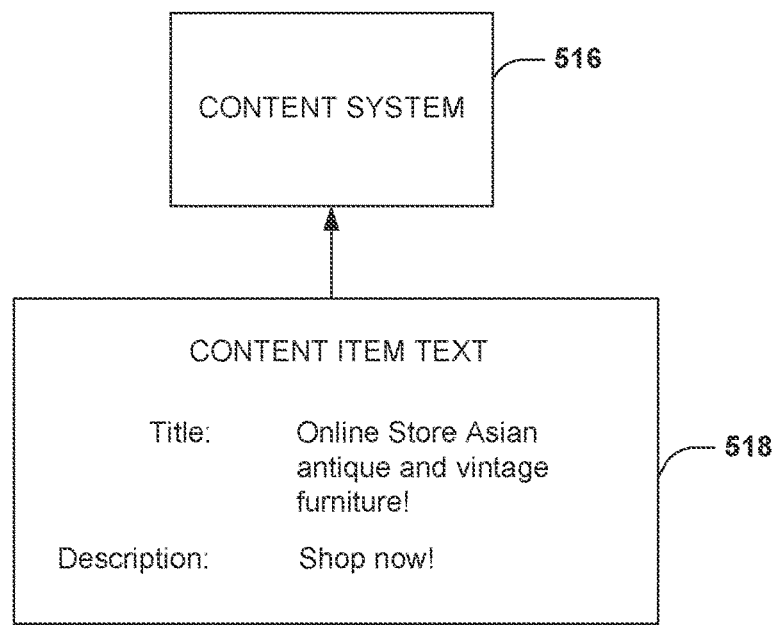
FIG. 5B is a component block diagram illustrating an example system for generating a search query based upon received text and/or performing a search based upon the search query, where a first set of content item text is received by a content system.

At 404, a first set of content item text may be received via the content item interface 502. FIG. 5B illustrates the first set of content item text (shown with reference number 518) being received by the content system (shown with reference number 516). In an example, the first set of content item text 518 may be input via the content item interface 502 (e.g., via the one or more input text fields of the content item interface 502). In an example, the first set of content item text 518 may comprise multiple parts, such as a title part (e.g., "Online Store Asian antique and vintage furniture!") and/or a description part (e.g., "Shop now!"). The title part may be input via the title input field 504, and/or the description part may be input via the description input field 506.

At 406, a set of content items may be selected from among a plurality of content items based upon the first set of content item text 518 and/or a plurality of sets of content item text associated with the plurality of content items. In some examples, the plurality of content items may comprise at least one of advertisements, social media posts, blog posts, slideshows, search results, news headlines, articles, social media feeds, suggested content (e.g., links to videos, audio, articles, social media feeds, etc.), etc. In an example, the set of content items may be determined to be related to the first set of content item text 518. For example, the set of content items may be determined to be similar (e.g., semantically similar, contextually similar and/or relevant) to the first set of content item text 518 (e.g., more similar to the first set of content item text 518 than other content items of the plurality of content items). The plurality of content items may be stored in a content items database (e.g., a database, of the content system, comprising the plurality of content items). In an example, content items of the plurality of content items may be generated (e.g., previously generated)

by entities (e.g., at least one of users, publishers, content creators, advertisers, companies, brands, etc.) using the content item interface 502. The set of content items may be selected by determining similarity scores associated with the plurality of sets of content item text, and selecting the set of content items based upon the similarity scores.

For example, a plurality of similarity scores associated with the plurality of sets of content item text may be determined based upon the first set of content item text 518 and/or the plurality of sets of content item text. A set of content item text of the plurality of sets of content item text (and/or each set of content item text of the plurality of sets of content item text) may comprise text of a content item of the plurality of content items. For example, the plurality of sets of content item text may comprise a second set of content item text comprising text of a second content item of the plurality of content items, a third set of content item text comprising text of a third content item of the plurality of content items, etc.

Figure 5C:
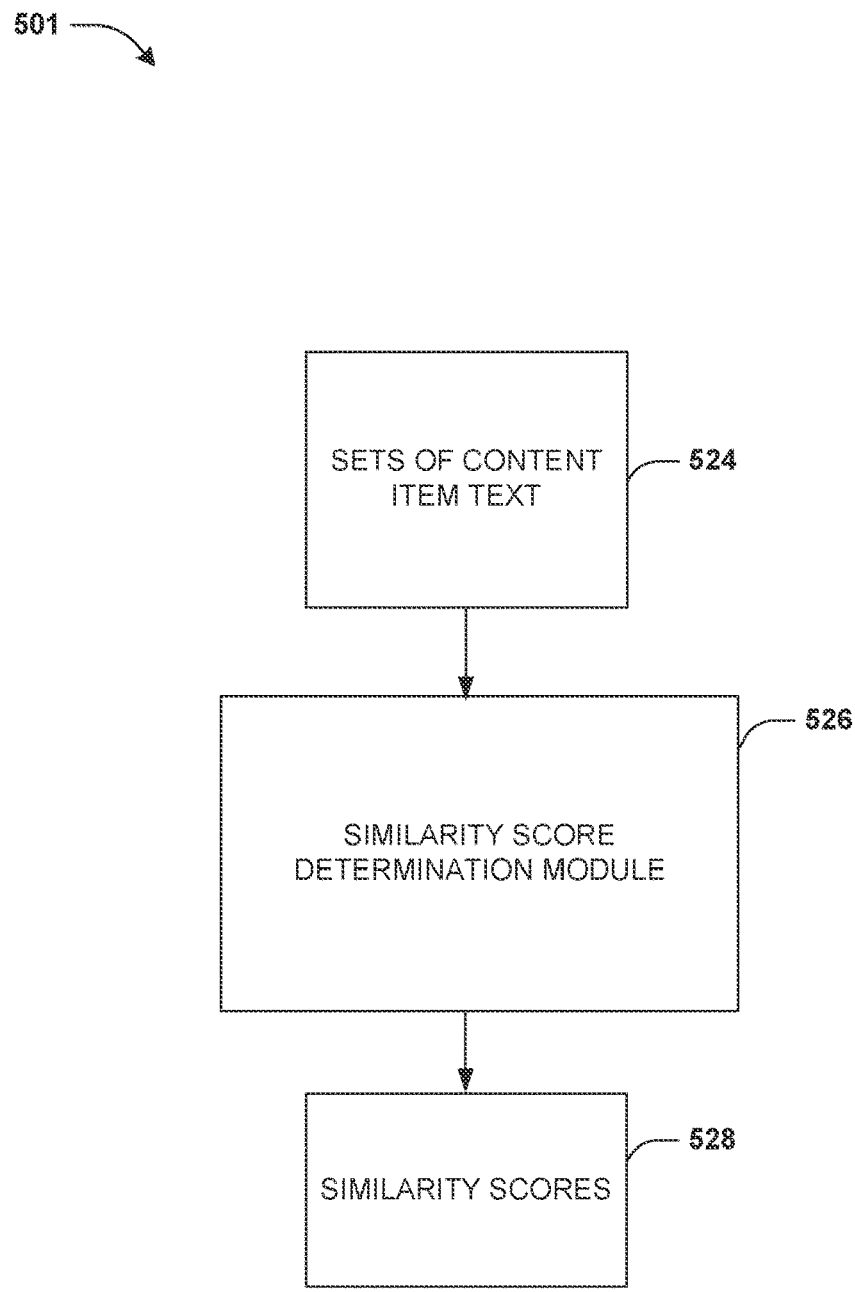
FIG. 5C is a component block diagram illustrating an example system for generating a search query based upon received text and/or performing a search based upon the search query, where a plurality of similarity scores are determined.

FIG. 5C illustrates determination of the plurality of similarity scores (shown with reference number 528). Information 524 may be input to a similarity score determination module 526. The similarity score determination module 526 may determine the plurality of similarity scores 528 based upon the information 524. The information 524 may comprise the first set of content item text 518 and/or the plurality of sets of content item text associated with the plurality of content items.

In some examples, a similarity score of the plurality of similarity scores 528 (and/or each similarity score of the plurality of similarity scores 528) may be associated with a similarity (e.g., at least one of a contextual similarity, a semantic similarity, a relevance, etc.) between the first set of content item text 518 and a set of content item text of the plurality of sets of content item text. In an example, the plurality of similarity scores 528 comprises a first similarity score associated with a first similarity between the first set of content item text 518 and the second set of content item text, a second similarity score associated with a second similarity between the first set of content item text 518 and the third set of content item text, etc.

In some examples, the plurality of similarity scores 528 may be determined by comparing the first set of content item text 518 with sets of content item text of the plurality of sets of content item text. For example, the first similarity score may be determined by comparing the first set of content item text 518 with the second set of content item text to identify one or more first words and/or one or more first characters in the first set of content item text 518 that match and/or are similar to one or more second words and/or one or more second characters in the second set of content item text. The first similarity score may be determined based upon the one or more first words, the one or more first characters, the one or more second words and/or the one or more second characters (such as based upon an amount of the one or more first words, the one or more first characters, the one or more second words and/or the one or more second characters, wherein an increase in the amount corresponds to an increase in the first similarity score, for example). In an example, a first word of the first set of content item text 518 may be determined to match a second word of the second set of content item text if the first word is the same as the second word, and/or if the first word comprises one or more letters that are the same as one or more letters of the second word (e.g., the first word may comprise "apple" and the second word may comprise "apples"). Alternatively and/or additionally, a third word of the first set of content item text 518 may be determined to be similar to a fourth word of the second set of content item text if the third word has a similar meaning as the fourth word, is a synonym of the fourth word, and/or is used in a similar context as the fourth word (e.g., the fourth word may comprise "buy" and the fourth word may comprise "purchase").

Alternatively and/or additionally, the plurality of similarity scores 528 may be determined based upon a first content item category (e.g., political advertisement category, car advertisement category, current events category, cooking category, etc.) associated with the first set of content item text 518. For example, the first content item category may be determined based upon information indicative of the first content item category received via the content item interface 502. Alternatively and/or additionally, the first content item category may be determined by analyzing the first set of content item text 518 (and/or one or more other sets of content item text) to determine the first content item category. For example, the first set of content item text 518 may be compared with a pre-defined set of content item categories (e.g., a list of advertisement categories) to determine the first content item category (e.g., the first content item category may be a category determined to be most similar to the first set of content item text 518 among the pre-defined set of content item categories). The first content item category may be determined using one or more techniques discussed below.

In an example, the first similarity score may be determined based upon the first content item category associated with the first set of content item text 518 and/or a second content item category associated with the second set of content item text (e.g., the second content item category may correspond to a content item category of the second content item comprising the second set of content item text). In an example, the first similarity score may be higher if the first content item category matches the second content item category (such as if both the first content item category and the second content item category correspond to political advertisements) than if the first content item category does not match the second content item category.

Alternatively and/or additionally, the plurality of similarity scores 528 may be determined based upon a first topic associated with the first set of content item text 518. For example, the first topic may be determined by analyzing the first set of content item text 518 (and/or one or more other sets of content item text), such as using one or more natural language processing (NLP) techniques, to determine the first topic. In an example, the first similarity score may be determined based upon the topic associated with the first set of content item text 518 and/or a second topic associated with the second set of content item text (e.g., the second content item category may correspond to a topic of the second content item comprising the second set of content item text). In an example, the first similarity score may be higher if the topic matches the second topic (such as if both the topic and the second topic correspond to politics) than if the topic does not match the second topic.

In some examples, the plurality of similarity scores 528 may be determined by generating representations of sets of content item text and/or determining similarity scores based upon the representations. In an example, a first representation of the first set of content item text 518 may be determined. In some examples, the first representation may be an embedding-based representation. The first representation may be determined based upon a first set of representations. The first set of representations may comprise representations of tokens of the first set of content item text 518 (e.g., representations of all tokens of the first set of content item text 518), wherein the tokens may be at least one of phrases of the first set of content item text 518, words of the first set of content item text 518, characters of the first set of content item text 518, etc. A representation of the first set of representations may comprise an embedding (e.g., a vector representation) of a token, a phrase, a word, a character, etc. of the first set of content item text 518. In an example, a representation of the first set of representations may be determined using at least one of word2vec, fastText, Bidirectional Encoder Representations from Transformers (BERT), sentence-BERT, etc. In some examples, one or more operations (e.g., mathematical operations) may be performed using the first set of representations to determine the first representation of the first set of content item text 518. In an example, representations of the first set of representations may be averaged to determine the first representation (e.g., the first representation may correspond to an average of the first set of representations). Alternatively and/or additionally, the first representation may be determined based upon the first set of content item text 518 using at least one of word2vec, fastText, BERT, sentence-BERT, etc. In some examples, a model (e.g., at least one of a word2vec model, a fastText model, a BERT model, a sentence-BERT model, etc.) used for determining the first representation (and/or the first set of representations) may be trained for textual similarity, such as for semantic textual similarity (e.g., the first representation may be based upon and/or representative of a meaning and/or context of the first set of content item text 518).

In some examples, a plurality of representations (e.g., embedding-based representations) associated with the plurality of sets of content item text may be determined. A representation of the plurality of representations (and/or each representation of the plurality of representations) may correspond to a representation (e.g., an embedding-based representation) of a set of content item text of the plurality of sets of content item text. For example, the plurality of representations may comprise a second representation (e.g., embedding-based representation) of the second set of content item text, a third representation (e.g., embedding-based representation) of the third set of content item text, etc. In some examples, representations of the plurality of representations may be determined using one or more of the techniques provided herein with respect to determining the first representation of the first set of content item text 518.

In some examples, the plurality of similarity scores 528 may be determined based upon the first representation of the first set of content item text 518 and the plurality of representations associated with the plurality of sets of content item text. In an example, the first similarity score associated with the first similarity between the first set of content item text 518 and the second set of content item text may be determined based upon the first representation of the first set of content item text 518 and the second representation of the second set of content item text. For example, one or more operations (e.g., mathematical operations) may be performed using the first representation and the second representation to determine the first similarity score. In an example, the first similarity score may be based upon (and/or may be equal to) a measure of similarity between the first representation and the second representation, such as a cosine similarity between the first representation and the second representation. In some examples, other similarity scores (other than the first similarity score) of the plurality of similarity scores 528 may be determined using one or more of the techniques provided herein with respect to determining the first similarity score.

Figure 5D:
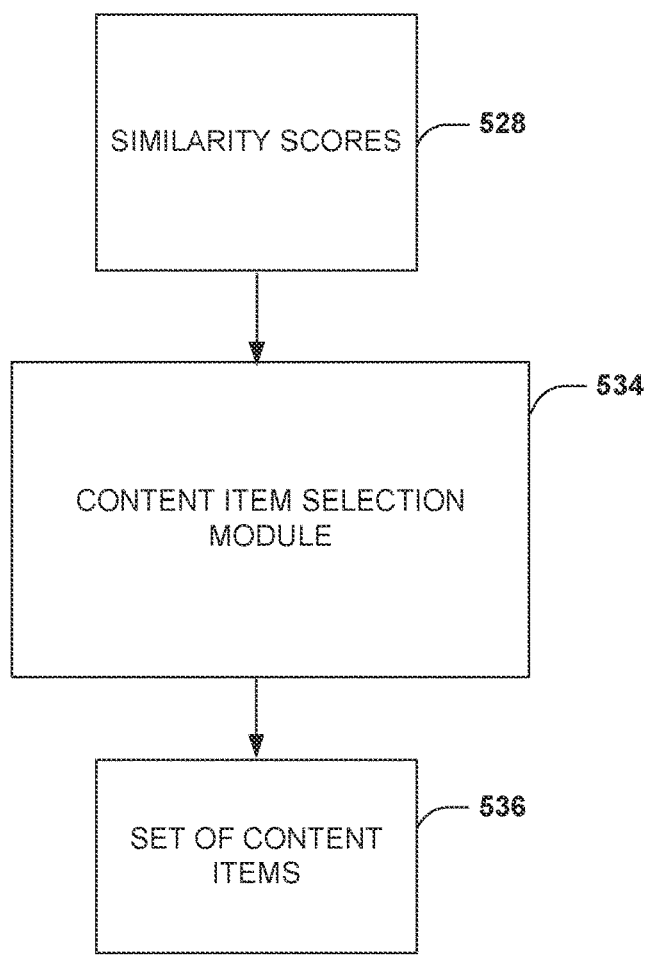
FIG. 5D is a component block diagram illustrating an example system for generating a search query based upon received text and/or performing a search based upon the search query, where a set of content items are selected based upon a plurality of similarity scores.

In an example shown in FIG. 5D, the set of content items (shown with reference number 536) may be selected by a content item selection module 534 based upon the plurality of similarity scores 528. In some examples, the set of content items 536 may be selected from among the plurality of content items based upon a determination that the set of content items 536 are associated with highest similarity scores of the plurality of similarity scores 528. Alternatively and/or additionally, the set of content items 536 may be selected based upon a determination that the set of content items 536 are associated with m highest similarity scores of the plurality of similarity scores 528 (e.g., content items associated with the m highest similarity scores of the plurality of similarity scores 528 may be included in the set of content items 536). In an example where m is 10, 10 content items associated with the 10 highest similarity scores of the plurality of similarity scores 528 may be selected and/or included in the set of content items 536. Alternatively and/or additionally, the plurality of content items may be ranked based upon the plurality of similarity scores 528 (e.g., a content item having a higher similarity score of the plurality of similarity scores 528 is ranked higher than a content item having a lower similarity score of the plurality of similarity scores 528), and/or the top m ranked content items may be selected from among the plurality of content items (e.g., the top m ranked content items may be included in the set of content items 536). Alternatively and/or additionally, the set of content items 536 may be selected from among the plurality of content items based upon a determination that the set of content items 536 are associated with similarity scores (of the plurality of similarity scores 528) that exceed a threshold similarity score.

In some examples, the set of content items 536 may be selected from among the plurality of content items using one or more techniques to perform a nearest neighbor search (NNS) based upon the first representation and the plurality of representations. In some examples, the NNS may be performed using one or more k-nearest neighbors (k-NN) techniques and/or one or more approximate nearest neighbors techniques. In an example, the one or more k-NN techniques and/or the one or more approximate nearest neighbors techniques may be used to determine the plurality of similarity scores 528 and/or to select the set of content items 536 from the plurality of content items based upon at least one of the plurality of similarity scores 528, the first set of content item text 518, the plurality of sets of content item text, the first representation of the first set of content item text 518, the plurality of representations associated with the plurality of sets of content item text, etc.

At 408, a set of terms may be determined based upon the first set of content item text 518 and the set of content items 536. For example, terms of the set of terms may correspond to at least one of words, phrases, sets of characters, etc. In an example, each term of the set of terms may be a word.

In some examples, one or more types of words may not be included in the set of terms. For example, the one or more types of terms not included in the set of terms may comprise pronouns (e.g., at least one of he, she, they, etc.), articles (e.g., at least one of a, an, the, etc.), conjunctions (e.g., at least one of and, or, but, etc.) and/or one or more other types of words.

In some examples, the set of terms may comprise one or more first terms based upon the first set of content item text 518. In some examples, the one or more first terms are terms of the first set of content item text 518. In an example in which the first set of content item text 518 comprises "Online Store Asian antique and vintage furniture!", the one or more first terms may comprise terms "online", "store", "asian", "vintage", and "furniture". In an example, term "and" may not be included in the one or more first terms based upon a determination that the term "and" is a conjunction not to be included in the set of terms.

In some examples, the set of terms may comprise additional terms that are based upon content items of the set of content items 536. The additional terms may comprise text-based terms that are based upon sets of content item text of the set of content items 536 and/or image-based terms that are based upon images of the set of content items 536. In an example, the text-based terms may comprise one or more first text-based terms based upon a fourth set of content item text of a fourth content item of the set of content items 536 and/or one or more first image-based terms based upon an image of the fourth content item.

Figure 5E:
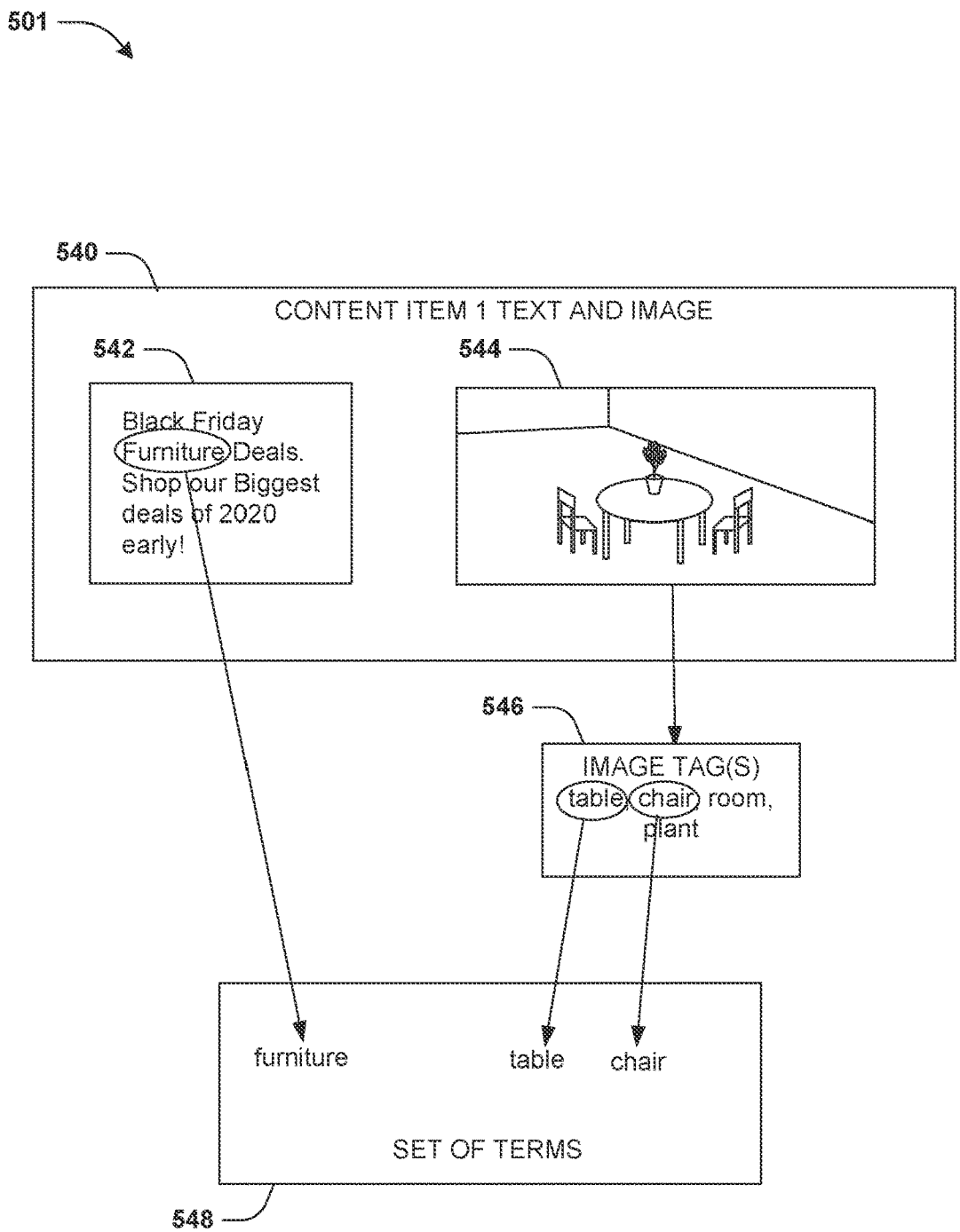
FIG. 5E is a component block diagram illustrating an example system for generating a search query based upon received text and/or performing a search based upon the search query, where one or more first text-based terms and/or one or more first image-based terms are determined based upon a fourth content item.

FIG. 5E illustrates determining the one or more first text-based terms and the one or more first image-based terms based upon the fourth content item (shown with reference number 540) of the set of content items 536. For example, the one or more first text-based terms determined based upon the fourth set of content item text (shown with reference number 542) may comprise a term "furniture". For example, the term "furniture" may be selected from the fourth set of content item text 542 for inclusion in the set of terms (shown with reference number 548).

Alternatively and/or additionally, the one or more first image-based terms determined based upon the image (shown with reference number 544) of the fourth content item 540 may comprise a term "table" and a term "chair". For example, the term "table" and the term "chair" may be selected for inclusion in the set of terms 548 from a set of object terms 546 (e.g., image tags) associated with objects in the image 544. In an example, the image 544 may be analyzed to identify the set of object terms 546. For example, the image 544 may be analyzed using one or more object detection techniques (e.g., at least one of one or more computer vision techniques, one or more object recognition techniques, one or more image classification techniques, etc.) to detect the objects in the image 544 and/or determine the set of object terms 546 associated with the objects. In an example, the objects may be detected and/or the set of object terms 546 may be determined using an object detector, such as a convolutional neural network (CNN) object detector (e.g., at least one of region-based CNN (R-CNN) object detector, fast R-CNN object detector, faster R-CNN object detector, etc.) or other type of object detector. Confidence scores associated with the objects and/or the set of object terms 546 may be generated by the object detector (e.g., each object term of the set of object terms 546 may be associated with a confidence score of the confidence scores). In some examples, an object term of the set of object terms 546 may be selected for inclusion in the set of terms 548 based upon a determination that the object term is associated with a confidence score that meets a threshold confidence score (e.g., a threshold of 0.8 or other threshold). For example, object terms that are associated with confidence scores that do not meet the threshold confidence score may not be included in the set of terms 548.

A plurality of text-based terms may be determined based upon sets of content item text of the set of content items 536. The plurality of text-based terms may comprise some and/or all terms of the sets of content item text of the set of content items 536. A subset of text-based terms, of the plurality of text-based terms, may be selected for inclusion in the set of terms 548 based upon a second plurality of similarity scores associated with the plurality of text-based terms. A similarity score of the second plurality of similarity scores (and/or each similarity score of the second plurality of similarity scores) may be associated with a similarity (e.g., at least one of a contextual similarity, a semantic similarity, a relevance, etc.) between a term of the plurality of text-based terms and a term (e.g., a most similar term) of the first set of content item text 518.

In an example, a third similarity score of the second plurality of similarity scores may be associated a similarity between a text-based term of the plurality of text-based terms and a term (e.g., a most similar term) of the first set of content item text 518. The third similarity score may be a highest similarity score of one or more similarity scores associated with the text-based term and one or more terms of the first set of content item text 518 (e.g., for each term of the one or more terms of the first set of content item text 518, a similarity score associated with the text-based term may be determined to determine the one or more similarity scores, wherein the third similarity score is the highest similarity score of the one or more similarity scores). The third similarity score may be determined based upon a third representation (e.g., an embedding-based representation) of the text-based term and a fourth representation (e.g., an embedding-based representation) of the term (e.g., the most similar term) of the first set of content item text 518. For example, the third similarity score may be based upon (and/or may be equal to) a measure of similarity between the third representation and the fourth representation, such as a cosine similarity between the third representation and the fourth representation. In an example, the third representation and/or the fourth representation may be determined using at least one of word2vec, fastText, BERT, sentence-BERT, etc. Alternatively and/or additionally, a model (e.g., at least one of a word2vec model, a fastText model, a BERT model, a sentence-BERT model, etc.) used for determining the third representation and/or the fourth representation may be trained for textual similarity, such as for semantic textual similarity. Alternatively and/or additionally, the third similarity score may be a combination of the one or more similarity scores associated with the text-based term (e.g., the one or more similarity scores may be combined, such as averaged, to determine the third similarity score). In some examples, other similarity scores (other than the third similarity score) of the second plurality of similarity scores may be determined using one or more of the techniques provided herein with respect to determining the third similarity score.

In some examples, the subset of text-based terms may be selected from among the plurality of text-based terms for inclusion in the set of terms 548 based upon a determination that the subset of text-based terms are associated with highest similarity scores of the second plurality of similarity scores. Alternatively and/or additionally, the subset of text-based terms may be selected based upon a determination that the subset of text-based terms are associated with n highest similarity scores of the second plurality of similarity scores (e.g., text-based terms associated with the n highest similarity scores of the second plurality of similarity scores may be included in the set of terms 548). In an example where n is 10, 10 text-based terms associated with the 10 highest similarity scores of the second plurality of similarity scores may be selected and/or included in the set of terms 548. Alternatively and/or additionally, the plurality of text-based terms may be ranked based upon the second plurality of similarity scores (e.g., a text-based term having a higher similarity score of the second plurality of similarity scores is ranked higher than a text-based term having a lower similarity score of the second plurality of similarity scores), and/or the top n ranked text-based terms may be selected from among the plurality of text-based terms (e.g., the top n ranked text-based terms may be included in the set of terms 548). Alternatively and/or additionally, the subset of text-based terms may be selected from among the plurality of text-based terms based upon a determination that the subset of text-based terms are associated with similarity scores (of the second plurality of similarity scores) that exceed a second threshold similarity score (e.g., text-based terms that are associated with similarity scores, of the second plurality of similarity scores, lower than the second threshold similarity score may not be included in the set of terms 548).

In an example implementation, n may correspond to a maximum number of text-based terms (from the set of content items 536, for example) to be added to the set of terms 548. The second threshold similarity score may correspond to a minimum cosine similarity between a text-based term and a term of the set of content item text 518 (where the second threshold similarity score may be satisfied if a cosine similarity between the text-based term and at least one term of the set of content item text 518 exceeds the minimum cosine similarity, for example). Text-based terms may be sorted (e.g., ordered and/or arranged) in the following manner to determine an arrangement of text-based terms: (i) content items of the set of content items 536 may be sorted in decreasing order of relevance to the first set of content item text 518 to determine an arrangement of the content items (e.g., the arrangement of the content items may be sorted in decreasing order of similarity scores of the plurality of similarity scores 528), (ii) sets of content item text of the content items may be sorted in accordance with the arrangement of the content items, and/or (iii) for each set of content item text of the sets of content item text, text-based terms within the set of content item text may be sorted in order of occurrence in the set of content item text. Iterations for selecting text-based terms that satisfy the second threshold similarity score may be performed, according to the arrangement of text-based terms (or a different arrangement of text-based terms), until text-based terms selected for inclusion in the set of terms 548 amount to the maximum number of text-based terms (or until all text-based terms that satisfy the second threshold similarity score are selected for inclusion in the set of terms 548).

A plurality of image-based terms may be determined based upon images of the set of content items 536. The plurality of image-based terms may comprise some and/or all terms object terms (e.g., image tags) of the images of the set of content items 536. For example, the object terms may comprise the set of object terms 546 associated with the image 544 of the fourth content item 540 and/or other object terms determined based upon images of other content items (other than the fourth content item 540) of the set of content items 536. In some examples, the other object terms may be determined using one or more of the techniques provided herein with respect to determining the set of object terms 546. A subset of image-based terms, of the plurality of image-based terms, may be selected for inclusion in the set of terms 548 based upon a third plurality of similarity scores associated with the plurality of image-based terms. A similarity score of the third plurality of similarity scores (and/or each similarity score of the third plurality of similarity scores) may be associated with a similarity (e.g., at least one of a contextual similarity, a semantic similarity, a relevance, etc.) between a term of the plurality of image-based terms and a term (e.g., a most similar term) of the first set of content item text 518.

In an example, a fourth similarity score of the third plurality of similarity scores may be associated a similarity between an image-based term of the plurality of image-based terms and a term (e.g., a most similar term) of the first set of content item text 518. The fourth similarity score may be a highest similarity score of one or more similarity scores associated with the image-based term and one or more terms of the first set of content item text 518 (e.g., for each term of the one or more terms of the first set of content item text 518, a similarity score associated with the image-based term may be determined to determine the one or more similarity scores, wherein the fourth similarity score is the highest similarity score of the one or more similarity scores). The fourth similarity score may be determined based upon a fifth representation (e.g., an embedding-based representation) of the image-based term and a sixth representation (e.g., an embedding-based representation) of the term (e.g., the most similar term) of the first set of content item text 518. For example, the fourth similarity score may be based upon (and/or may be equal to) a measure of similarity between the fifth representation and the sixth representation, such as a cosine similarity between the fifth representation and the sixth representation. In an example, the fifth representation and/or the sixth representation may be determined using at least one of word2vec, fastText, BERT, sentence-BERT, etc. Alternatively and/or additionally, a model (e.g., at least one of a word2vec model, a fastText model, a BERT model, a sentence-BERT model, etc.) used for determining the fifth representation and/or the sixth representation may be trained for textual similarity, such as for semantic textual similarity. Alternatively and/or additionally, the fourth similarity score may be a combination of the one or more similarity scores associated with the image-based term (e.g., the one or more similarity scores may be combined, such as averaged, to determine the fourth similarity score). In some examples, other similarity scores (other than the fourth similarity score) of the third plurality of similarity scores may be determined using one or more of the techniques provided herein with respect to determining the fourth similarity score.

In some examples, the subset of image-based terms may be selected from among the plurality of image-based terms for inclusion in the set of terms 548 based upon a determination that the subset of image-based terms are associated with highest similarity scores of the third plurality of similarity scores. Alternatively and/or additionally, the subset of image-based terms may be selected based upon a determination that the subset of image-based terms are associated with k highest similarity scores of the third plurality of similarity scores (e.g., image-based terms associated with the k highest similarity scores of the third plurality of similarity scores may be included in the set of terms 548). In an example where k is 10, 10 image-based terms associated with the 10 highest similarity scores of the third plurality of similarity scores may be selected and/or included in the set of terms 548. Alternatively and/or additionally, the plurality of image-based terms may be ranked based upon the third plurality of similarity scores (e.g., a text-based term having a higher similarity score of the third plurality of similarity scores is ranked higher than a text-based term having a lower similarity score of the third plurality of similarity scores), and/or the top k ranked image-based terms may be selected from among the plurality of image-based terms (e.g., the top k ranked image-based terms may be included in the set of terms 548). Alternatively and/or additionally, the subset of image-based terms may be selected from among the plurality of image-based terms based upon a determination that the subset of image-based terms are associated with similarity scores (of the third plurality of similarity scores) that exceed a third threshold similarity score (e.g., image-based terms that are associated with similarity scores, of the third plurality of similarity scores, lower than the third threshold similarity score may not be included in the set of terms 548). Alternatively and/or additionally, the subset of image-based terms may be selected from among the plurality of image-based terms based upon a determination that the subset of image-based terms are associated with confidence scores that exceed a threshold confidence score (e.g., image-based terms that are associated with confidence scores lower than the threshold confidence score may not be included in the set of terms 548).

In an example implementation, k may correspond to a maximum number of image-based terms (from the set of content items 536, for example) to be added to the set of terms 548. The third threshold similarity score may correspond to a minimum cosine similarity between an image-based term and a term of the set of content item text 518 (where the third threshold similarity score may be satisfied if a cosine similarity between the image-based term and at least one term of the set of content item text 518 exceeds the minimum cosine similarity, for example). Image-based terms may be sorted (e.g., ordered and/or arranged) in the following manner to determine an arrangement of image-based terms: (i) content items of the set of content items 536 may be sorted in decreasing order of relevance to the first set of content item text 518 to determine an arrangement of the content items (e.g., the arrangement of the content items may be sorted in decreasing order of similarity scores of the plurality of similarity scores 528), (ii) sets of image-based terms associated with the content items may be sorted in accordance with the arrangement of the content items, and/or (iii) for each set of image-based terms of the sets of image-based terms, image-based terms within the set of image-based terms may be sorted in decreasing order of confidence scores. Iterations for selecting image-based terms that satisfy the third threshold similarity score and/or the threshold confidence score may be performed, according to the arrangement of image-based terms (or a different arrangement of image-based terms), until image-based terms selected for inclusion in the set of terms 548 amount to the maximum number of image-based terms (or until all image-based terms that satisfy the third threshold similarity score and/or that satisfy the threshold confidence score are selected for inclusion in the set of terms 548).

At 410, a similarity profile associated with the set of terms 548 is generated. The similarity profile may be indicative of similarity scores associated with similarities between terms of the set of terms 548 (e.g., similarities between pairs of terms of the set of terms 548). In an example, for each pair of terms of one or more pairs of terms of the set of terms 548 (e.g., the one or more pairs of terms may comprise some and/or all pairs of terms of the set of terms 548), a similarity score associated with a similarity (e.g., at least one of a contextual similarity, a semantic similarity, a relevance, etc.) between the pair of terms may be determined, wherein the similarity profile is indicative of the similarity score. In an example, representations (e.g., embedding-based representations) of the set of terms 548 may be determined. For example, the representations may be determined using at least one of word2vec, fastText, BERT, sentence-BERT, etc.

Alternatively and/or additionally, a model (e.g., at least one of a word2vec model, a fastText model, a BERT model, a sentence-BERT model, etc.) used for determining the representations may be trained for textual similarity, such as for semantic textual similarity. The similarity scores of the similarity profile may be determined based upon the representations (e.g., a similarity score associated with a similarity between a pair of terms of the set of terms 548 may be based upon and/or equal to a measure of similarity between a pair of representations of the pair of terms, such as a cosine similarity between the pair of representations).

Figure 5F:
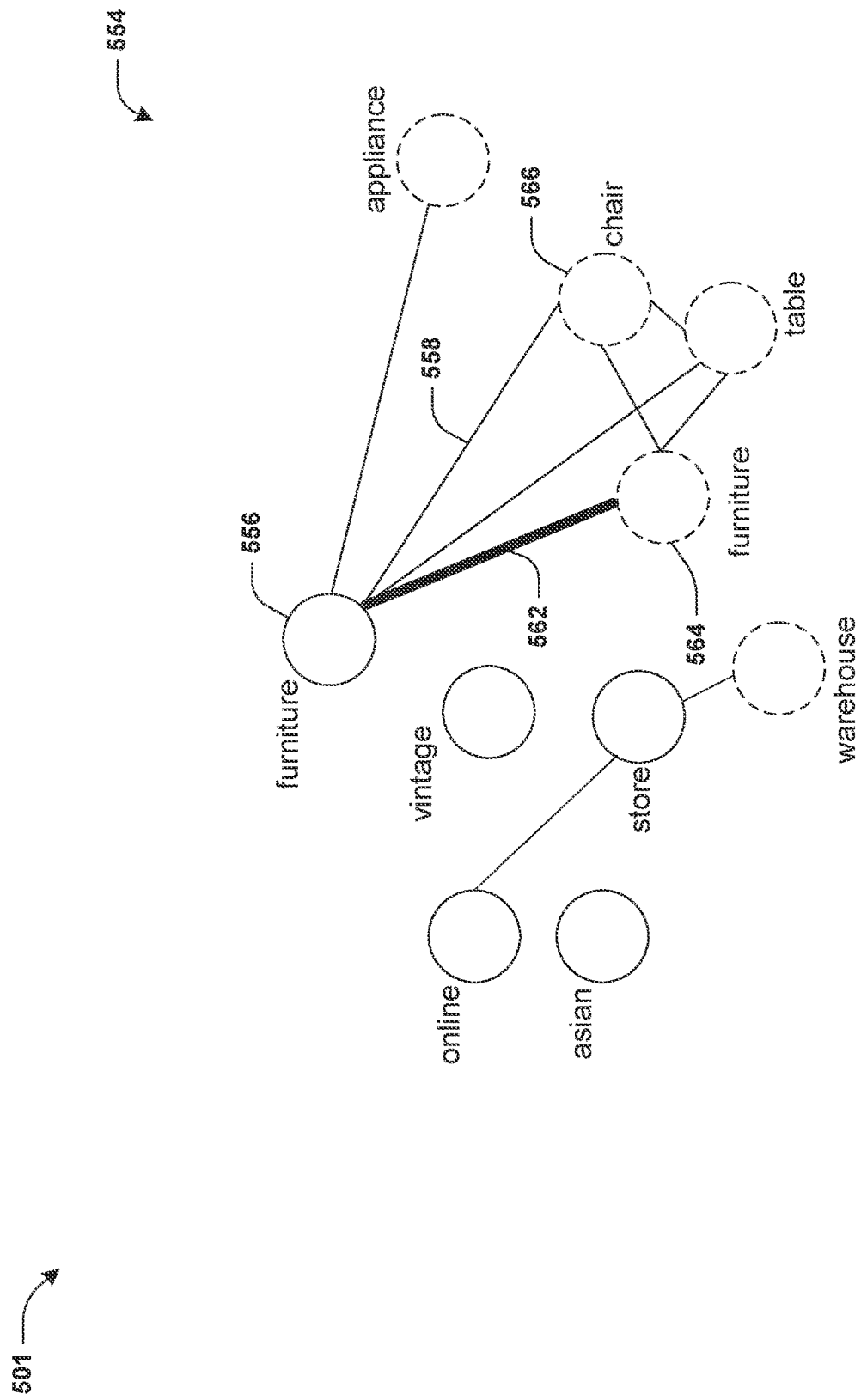
FIG. 5F is a component block diagram illustrating a graph of a similarity profile of an example system for generating a search query based upon received text and/or performing a search based upon the search query.

In some examples, the similarity profile comprises a graph. FIG. 5F illustrates the graph (shown with reference number 554) of the similarity profile. The graph 554 may comprise edges (e.g., lines, such as similarity lines) between nodes (e.g., vertices) corresponding to terms of the set of terms 548. Nodes of the graph 554 that correspond to the additional terms (e.g., image-based terms and/or text-based terms from content items of the set of content items 536) are shown as circles with dashed circumferences. Nodes of the graph 554 that correspond to the one or more first terms from the first set of content item text 518 are shown as circles with solid circumferences.

In some examples, in the graph 554, edges between nodes may be weighted based upon similarity scores associated with the edges. For example, an edge between a pair of nodes may be weighted based upon a similarity score associated with a similarity between a pair of terms corresponding to the pair of nodes. For example, a thickness of an edge between a pair of nodes may be indicative of a similarity score associated with a similarity between a pair of terms corresponding to the pair of nodes. For example, the graph 554 may comprise a first edge 558 between a first node 556 and a second node 566, and a second edge 562 between the first node 556 and a third node 564. The first node 556 may correspond to term "furniture" from the first set of content item text 518, the second node 566 may correspond to term "chair" of the additional terms and/or the third node 564 may correspond to term "furniture" of the additional terms. The second edge 562 may have a greater thickness than the first edge 558, indicating that a similarity score associated with a similarity between term "furniture" from the first set of content item text 518 and term "furniture" of the additional terms is greater than a similarity score associated with a similarity between term "furniture" from the first set of content item text 518 and term "chair" of the additional terms.

In some examples, in the graph 554, there not being an edge between a pair of nodes may indicate that a similarity score, associated with a similarity between a pair of terms corresponding to the pair of nodes, is less than a threshold similarity score. In some examples, if a similarity score associated with a similarity between a pair of terms is less than a threshold similarity score, the similarity score may be set to zero in the similarity profile.

At 412, a plurality of relevance scores associated with terms of the set of terms 548 are determined based upon the similarity profile. A relevance score of the plurality of relevance scores (and/or each relevance score of the plurality of relevance scores) may be associated with a term of the plurality of terms. In some examples, a first relevance score associated with a first term of the set of terms 548 may be determined based upon one or more biases associated with the first term and/or one or more similarity scores, of the similarity profile, associated with the first term. In an example, the first relevance score may be indicative of a measure of relevance of the first term to at least one of the first set of content item text 518, an image search performed for finding an image associated with the first set of content item text 518, etc.

In some examples, the one or more biases may comprise a self-bias associated with the first term. The self-bias may be determined based upon a similarity score between the first term and the first set of content item text 518, where the similarity score may be determined based upon a representation (e.g., an embedding-based representation) of the first term and a representation (e.g., an embedding-based representation) of the first set of content item text 518. The representation of the first set of content item text 518 may comprise the first representation of the first set of content item text 518. In an example, the representation of the first term may be determined using at least one of word2vec, fastText, BERT, sentence-BERT, etc. Alternatively and/or additionally, a model (e.g., at least one of a word2vec model, a fastText model, a BERT model, a sentence-BERT model, etc.) used for determining the representation of the first term may be trained for textual similarity, such as for semantic textual similarity. In an example, a higher similarity score between the first term and the first set of content item text 518 may result in a higher self-bias and/or a higher relevance score of the first term (e.g., terms that are closer to an overall meaning, such as semantic meaning, of the first set of content item text 518 may have higher relevance scores). In an example, the self-bias, $bias_i^{(self)}$, may be defined as:

$$bias_i^{(self)} = \langle \phi(a_{in}), \phi(w_i) \rangle$$

where $\phi(a_{in})$ is the first representation of the first set of content item text 518, $\phi(w_i)$ is the representation of the first term and/or $\langle \phi(a_{in}), \phi(w_i) \rangle$ denotes a measure of similarity (e.g., a cosine similarity) between the first representation and the representation of the first term.

In some examples, the one or more biases may comprise a category bias associated with the first term. The category bias may be determined based upon a similarity score between the first term and the first content item category associated with the first set of content item text 518, where the similarity score may be determined based upon the representation (e.g., the embedding-based representation) of the first term and a representation (e.g., an embedding-based representation) of the first content item category. In an example, the representation of the first content item category may be determined using at least one of word2vec, fastText, BERT, sentence-BERT, etc. Alternatively and/or additionally, a model (e.g., at least one of a word2vec model, a fastText model, a BERT model, a sentence-BERT model, etc.) used for determining the representation of the first content item category may be trained for textual similarity, such as for semantic textual similarity. In an example, a higher similarity score between the first term and the first content item category may result in a higher category bias and/or a higher relevance score of the first term (e.g., terms that are closer to a meaning, such as semantic meaning, of the first content item category may have higher relevance scores). In an example, the category bias, $bias_i^{(cat)}$, may be defined as:

$$bias_i^{(cat)} = \langle \phi(\hat{c}), \phi(w_i) \rangle$$

where $\phi(\hat{c})$ is the representation of the first content item category, $\phi(w_i)$ is the representation of the first term and/or $\langle \phi(\hat{c}), \phi(w_1) \rangle$ denotes a measure of similarity (e.g., a cosine similarity) between the representation of the first content item category and the representation of the first term.

In an example, the first content item category, $\hat{c}$, may be determined based upon:

$$\hat{c} = \arg\max_{c \in C} \langle \phi(c), \phi(a_{in}) \rangle$$

where C corresponds to the pre-defined set of content item categories, $c \in C$ corresponds to each content item category of the pre-defined set of content item categories C (e.g., travel, legal services, fashion, digital entertainment, etc.), $\phi(c)$ is a representation (e.g., an embedding-based representation) of a content item category c of the pre-defined set of content item categories C, $\phi(a_{in})$ is the first representation of the first set of content item text 518, and/or $\langle \phi(c), \phi(a_{in}) \rangle$ denotes a measure of similarity (e.g., a cosine similarity) between the representation of the content item category c and the first representation of the first set of content item text 518.

In some examples, the first relevance score associated with the first term may be determined by combining the one or more biases (e.g., the self-bias and/or the category bias) and/or the one or more similarity scores, of the similarity profile, associated with the first term. For example, one or more operations (e.g., mathematical operations) may be performed using the one or more biases and/or the one or more similarity scores to determine the first relevance score. In some examples, the one or more similarity scores may comprise one, some and/or all similarity scores, associated with the first term, of the similarity profile. In an example, the first term having higher similarity scores (and/or a greater quantity of similarity scores that are not equal to zero) may result in a higher relevance score of the first term (e.g., terms that are more similar to other terms of the set of terms 548 and/or terms that are similar to more terms of the other terms may have higher relevance scores). In an example, the first relevance score, $rel_i$, may be defined as:

$$rel_i = bias_i^{(self)} \times bias_i^{(cat)} \times (1-d) + d \times \left( \sum_{j \in N(i)} \frac{e_{ij}}{\sum_{k \in N(j)} e_{kj}} \times rel_j \right)$$

where i corresponds to an identifier of the first term (e.g., i may identify a node, in the graph 554, corresponding to the first term), $bias_i^{(self)}$ corresponds to the self-bias associated with the first term, $bias_i^{(cat)}$ corresponds to the category bias associated with the first term, d corresponds to a damping factor (e.g., 0.8 or other value), N(i) denotes terms of the set of terms 548 that the first term shares an edge with in the similarity profile (e.g., N(i) denotes nodes of the graph 554 that the node corresponding to the first term shares an edge with), $e_{ij}$ corresponds to a similarity score between the first term and a second term j (e.g., $e_{ij} = \langle \phi(w_i), \phi(w_j) \rangle$), and/or $rel_j$ corresponds to a relevance score of the second term j.

In some examples, other relevance scores (other than the first relevance score associated with the first term) of the plurality of relevance scores may be determined using one or more of the techniques provided herein with respect to determining the first relevance score associated with the first term.

At 414, one or more search terms may be selected from among the set of terms 548 based upon the plurality of relevance scores. In some examples, the one or more search terms may be selected from among the set of terms 548 based upon a determination that the one or more search terms are associated with highest relevance scores of the plurality of relevance scores. Alternatively and/or additionally, the one or more search terms may be selected based upon a determination that the one or more search terms are associated with p highest relevance scores of the plurality of relevance scores (e.g., terms associated with the p highest relevance scores of the plurality of relevance scores may be included in the one or more search terms). In an example where p is 1, a single term associated with the highest relevance score of the plurality of relevance scores may be selected as the one or more search terms (e.g., the one or more search terms may merely comprise the single term). In an example where p is 2, 2 terms associated with the 2 highest relevance score of the plurality of relevance scores may be selected as the one or more search terms (e.g., the one or more search terms may merely comprise the 2 terms). Alternatively and/or additionally, the set of terms 548 may be ranked based upon the plurality of relevance scores (e.g., a term having a higher relevance score may be ranked higher than a term having a lower relevance score), and/or the top p ranked terms may be selected from among the set of terms 548 (e.g., the top p ranked terms may be included in the one or more search terms). Alternatively and/or additionally, the one or more search terms may be selected from among the set of terms 548 based upon a determination that the one or more search terms are associated with relevance scores (of the plurality of relevance scores) that exceed a threshold relevance score.

At 416, an image search may be performed, using an image database, based upon the one or more search terms. In some examples, the image database may comprise one or more image libraries (e.g., one or more stock image libraries) comprising images (e.g., images that can be used in content items, such as for marketing campaigns). In some examples, a search query may be generated based upon the one or more search terms, where the image search is performed using the search query. The search query may comprise the one or more search terms. In an example in which the one or more search terms comprise a single search term "furniture", the search query may be "furniture". In an example in which the one or more search terms comprise multiple search terms "antique" and "furniture", the search query may be "antique furniture".

In some examples, using one or more of the techniques herein, the one or more search terms may be determined (e.g., automatically determined), the search query may be generated (e.g., automatically generated) and/or the image search may be performed (e.g., automatically performed) in response to receiving the first set of content item text 518 and/or in response to receiving a selection of the selectable input 508 (shown in FIG. 5A).

In some examples, the image search may be performed using a search engine configured to generate a set of search results based upon the search query. For example, the search engine may search for images throughout the image database to generate the set of search results, wherein a search result of the set of search results may be a database entry in the image database (e.g., the database entry may comprise an image in the image database). For example, the database may comprise keywords associated with images in the database. Keywords associated with search results (e.g., images) may be scanned and/or analyzed based upon the search query to determine the set of search results. An image of the database may be included in the set of search results based upon a determination that one or more keywords associated with the image matches and/or is related to at least a portion of the search query.

In response to generating the set of search results, the set of search results may be displayed via the first client device 500. FIG. 5G illustrates the content item interface 502 displaying the set of search results comprising a plurality of images 570. In the example shown in FIG. 5G, the search query may be "furniture" and/or the plurality of images 570 may be related to furniture. In some examples, the content item interface 502 may display a search field 574 (for in case a user wants to perform a search using a query other than the generated search query, for example). For example, in response to one or more keywords being entered (e.g., input) into the search field 574, a second search may be performed based upon the one or more keywords.

Figure 5H:
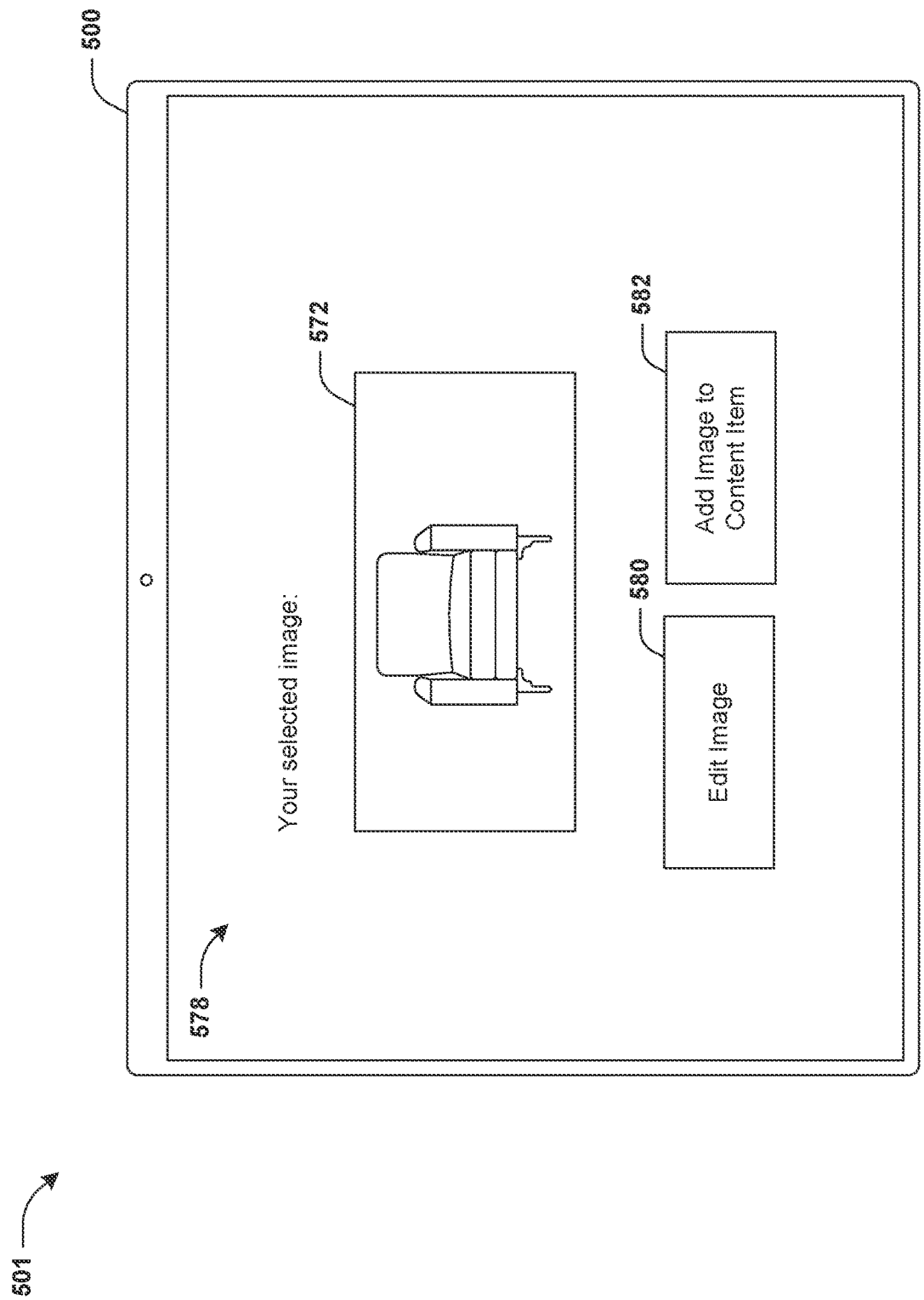
FIG. 5H is a component block diagram illustrating an example system for generating a search query based upon received text and/or performing a search based upon the search query, where an image interface is displayed.

In some examples, a selection of a first image 572 of the plurality of images 570 may be received from the first client device 500. Based upon the selection of the first image 572, a first content item 584 (shown in FIG. 5I) may be generated using the first image 572 and/or the first set of content item text 518. In response to the selection of the first image 572, the content item interface 502 may display an image interface 578 (shown in FIG. 5H) comprising one or more selectable inputs associated with the first image 572. For example, as shown in FIG. 5H, the image interface 578 may comprise a selectable input 580 "Edit Image" associated with editing the first image 572. In an example, in response to a selection of the selectable input 580, an image editing interface may be displayed, wherein the first image 572 may be edited (e.g., at least one of cropped, re-sized, recolored, etc.) via the editing interface. Alternatively and/or additionally, the image interface 578 may comprise a selectable input 582 "Add Image to Content Item" associated with adding the first image 572 to the first content item 584. In an example, in response to a selection of the selectable input 582, the first content item 584 may be generated to comprise the first image 572 and the first set of content item text 518. In some examples, the first content item 584 may comprise at least one of an advertisement, a social media post, a blog post, a slideshow, a search result, a news headline, an article, a social media feed, suggested content (e.g., a link to a video, audio, an article, a social media feed, etc.), etc.

Figure 5I:
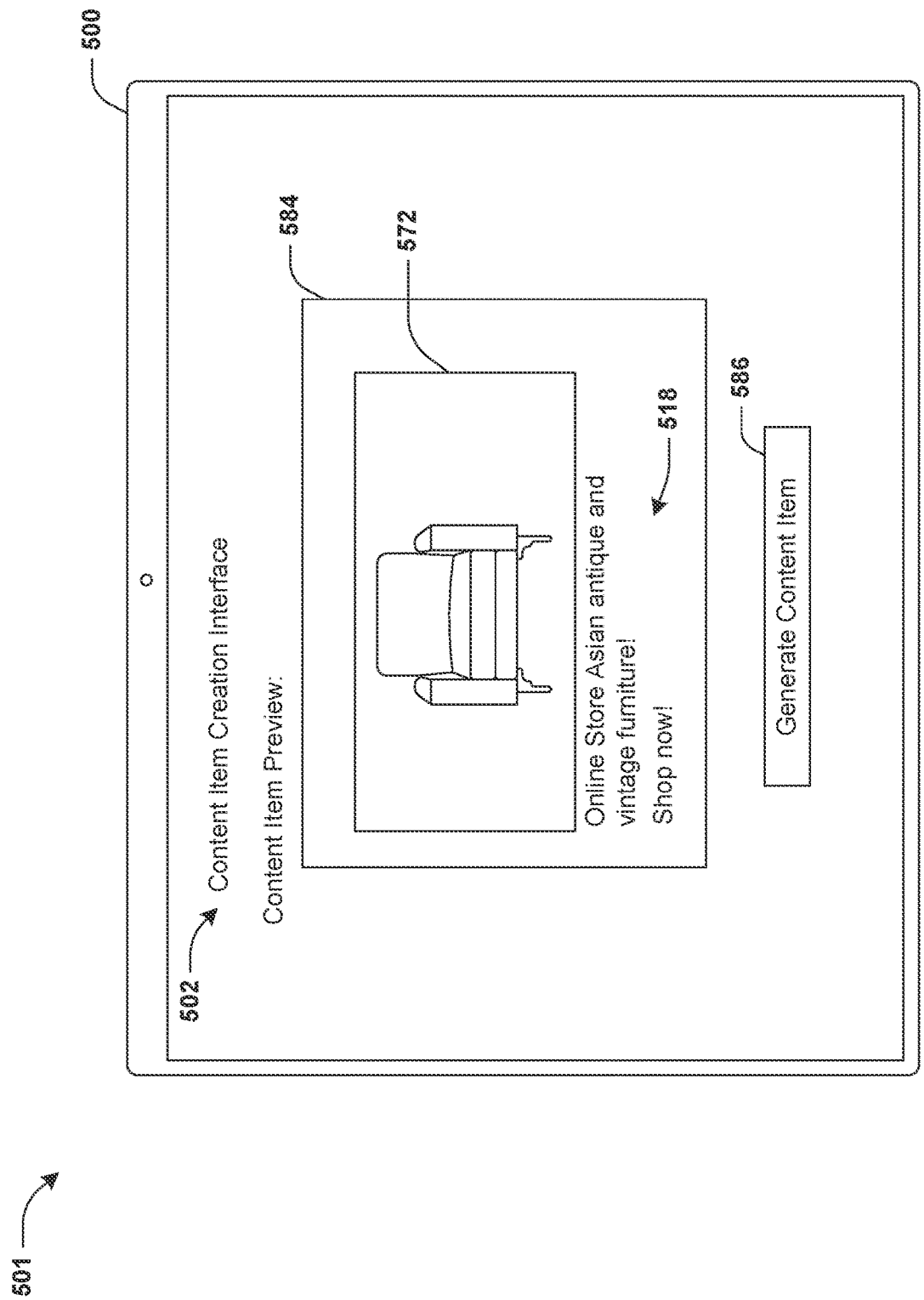
FIG. 5I is a component block diagram illustrating an example system for generating a search query based upon received text and/or performing a search based upon the search query, where a representation of a first content item is displayed.

In FIG. 5I, a representation (e.g., preview) of the first content item 584 may be displayed via the content item interface 502. Alternatively and/or additionally, the content item interface 502 may display a selectable input 586 "Target Content Item to Users". In some examples, in response to a selection of the selectable input 586, the first content item 584 may be targeted and/or presented to one or more users. A targeting interface may be displayed in response to the selection of the selectable input 586. Targeting information associated with the first content item 584 may be input and/or received via the targeting interface. A target audience to which the first content item 584 is targeted may be determined based upon the targeting information. For example, the first content item 584 may be presented via client devices associated with users of the target audience. In an example, the targeting information may be indicative of first demographic information and/or first location information of the target audience. The first content item 584 may be presented via a client device based upon a determination that a user associated with the client device is within the target audience (e.g., at least one of an age of the user is within an age range of the demographic information, a gender of the user matches a gender of the demographic information, a location of the user matches a location of the location information, etc.). For example, the first content item 584 may be presented (as an advertisement, for example) via the client device in response to receiving a request for content (e.g., an advertisement request) associated with the client device.

Although various examples of the present disclosure are described with respect to the first set of content item text 518 being in the English language, embodiments are contemplated in which the first set of content item text 518 comprises any language.

In some embodiments, the first set of content item text 518 may be in a first language that is different than a second language supported by at least one of the search engine, the image database, etc. Alternatively and/or additionally, the plurality of sets of content item text may be in the second language. In some examples, one or more of the techniques provided herein may be implemented to select the set of content items 536 based upon the plurality of sets of content item text (in the second language, for example) and the first set of content item text 518 (in the first language, for example). For example, the set of content items 536 may be selected based upon a determination that sets of content item text of the set of content items 536 are similar to (e.g., semantically similar to) the first set of content item text 518 (in the first language, for example). In some examples, the first set of content item text 518 may be translated to translated content item text (in the second language, for example), wherein the one or more first terms are selected, from the translated content item text, for inclusion in the set of terms 548. Accordingly, the set of terms 548, the one or more search terms and/or the search query may be in the second language, and thus, the image search may be performed in the second language.

Alternatively and/or additionally, prior to selecting the set of content items 536, the first set of content item text 518 may be translated to the translated content item text (in the second language, for example). The set of content items 536 may be determined based upon the plurality of sets of content item text (in the second language, for example) and the translated content item text (in the second language, for example). For example, the set of content items 536 may be selected based upon a determination that sets of content item text of the set of content items 536 are similar to (e.g., semantically similar to) the translated content item text (in the second language, for example). In some examples, the one or more first terms are selected, from the translated content item text, for inclusion in the set of terms 548. Accordingly, the set of terms 548, the one or more search terms and/or the search query may be in the second language, and thus, the image search may be performed in the second language.

Although various examples of the present disclosure are described with respect to searches and/or search results associated with images, embodiments are contemplated in which the searches and/or search results are associated with any type of searches and/or search results, such as searches performed to generate search results corresponding to at least one of web-pages, images, videos, data records, infographics, articles, research papers, etc. In an example, the image search performed at 416 may be replaced with any type of search, and/or the image database may be replaced with any type of database. Alternatively and/or additionally, rather than (and/or in addition to) performing the search using the image database, the search may be a web search throughout one or more websites and/or throughout the Internet, such as using a web crawler.

Although various examples of the present disclosure are described with respect to content items (e.g., the first content item 584 and/or the plurality of content items) comprising advertisements, embodiments are contemplated in which the content items comprise any type of content, such as at least one of social media posts, blog posts, slideshows, search results, news headlines, articles, social media feeds, suggested content (e.g., links to videos, audio, articles, social media feeds, etc.), etc. while staying within the scope of the present disclosure. Alternatively and/or additionally, embodiments are contemplated in which content item text (e.g., the first set of content item text 518 and/or the plurality of sets of content item text) comprises any type of text (e.g., text input via a text field, text of an article, a transcript of a video, a transcript of an audio file, text of a social media post, text of a blog post, etc.).

In some embodiments, one, some and/or all of the techniques provided herein may be implemented using an unsupervised system (e.g., a system that does not rely upon training data). Using the unsupervised system may provide for reduced manual effort and/or reduced cost (as a result of not requiring that training data be prepared and/or used to train a model, for example).

As used herein, the term "image" may correspond to any type of graphical object, such as at least one of a picture, a photograph, a drawing, a visual symbol, etc.

As used herein, the term "embedding-based representation" may correspond to at least one of a vector representation, an embedding, etc.

It may be appreciated that the disclosed subject matter may assist a user (and/or a device associated with the user) in designing and/or generating content items. Alternatively and/or additionally, the disclosed subject matter may assist the user (and/or the device) in efficiently and/or quickly displaying and/or viewing search results (e.g., search results comprising images from which an image may be selected for inclusion in a content item) without requiring the user to manually enter a search query, for example.

Implementation of at least some of the disclosed subject matter may lead to benefits including, but not limited to, an improved interface, a reduction in screen space and/or an improved usability of a display (e.g., of the device) (e.g., as a result of automatically generating a search query based upon the first set of content item text 518, as a result of automatically generating search results based upon the search query, as a result of automatically generating the first content item 584 comprising the first image 572 based upon the selection of the first image 572 from the search results, wherein separate applications and/or separate windows may not need to be opened in order to perform a search for the search results, wherein a keyboard may not need to be opened and/or used to input the search query, wherein separate applications and/or separate windows may not need to be opened in order to create the first content item 584 comprising the first image 572, etc.).

Alternatively and/or additionally, implementation of at least some of the disclosed subject matter may lead to benefits including a reduction in bandwidth (e.g., as a result of reducing a need for the user to search throughout the internet and/or navigate through internet content to find one or more images to be included in a content item, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
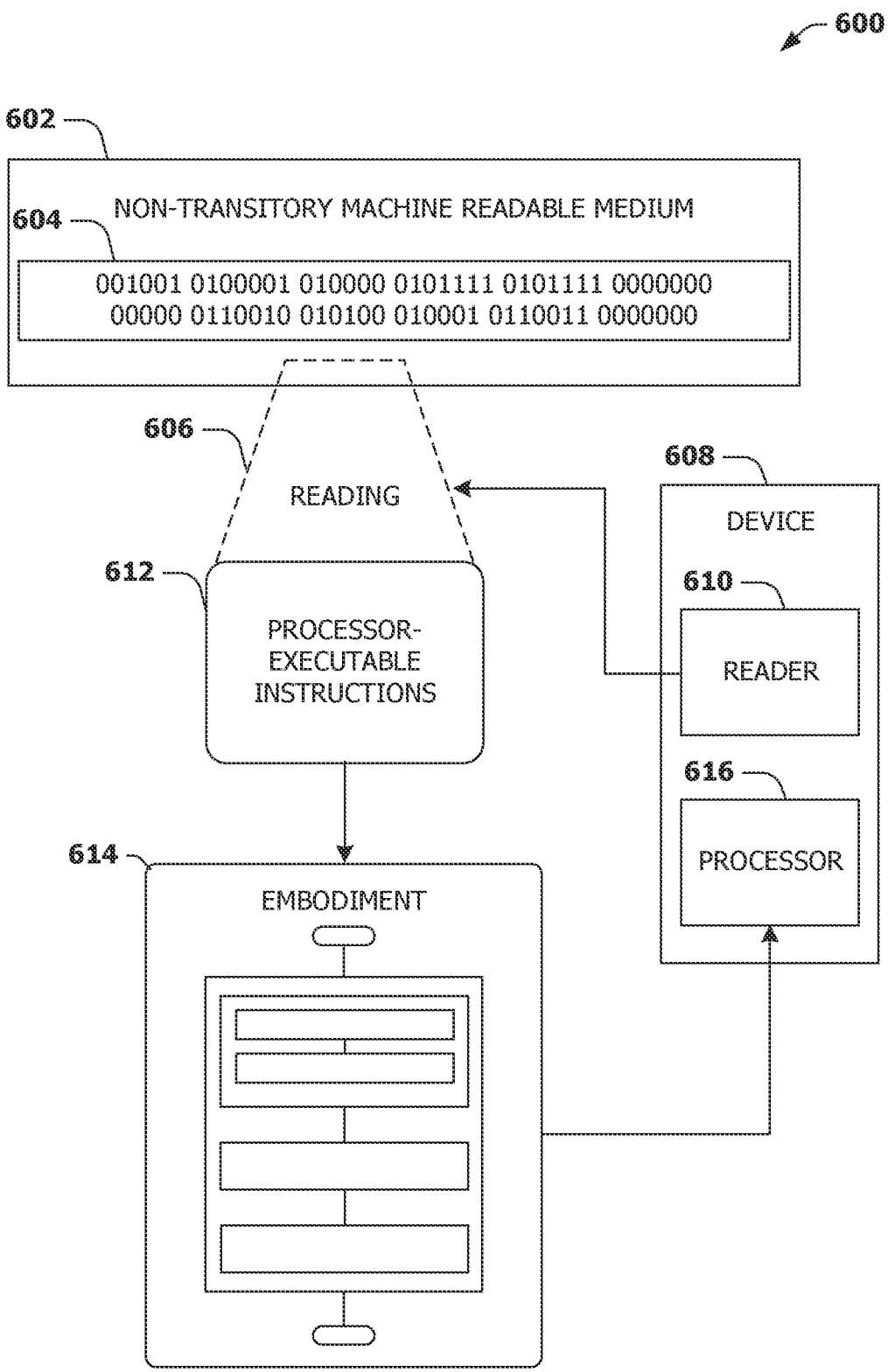
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    displaying a content item creation interface via a client device;
    receiving, via the content item creation interface, a first set of content item text;
    selecting, based upon the first set of content item text and a plurality of sets of content item text associated with a plurality of content items, a set of content items from among the plurality of content items;
    determining, based upon the first set of content item text and the set of content items, a set of terms;
    generating a similarity profile associated with the set of terms, wherein the similarity profile is indicative of similarity scores associated with similarities between terms of the set of terms;
    determining, based upon the similarity profile, relevance scores associated with the set of terms;
    selecting, based upon the relevance scores, one or more search terms from among the set of terms;
    performing, based upon the one or more search terms, an image search using an image database;
    displaying, via the content item creation interface, a set of search results of the image search;
    receiving, via the content item creation interface, a selection of an image of a plurality of images in the set of search results;
    responsive to the selection of the image, combining at least a portion of the image with the first set of content item text received via the content item creation interface to generate a content item; and presenting the generated content item to one or more other client devices.

2. The method of claim 1, comprising:

determining, based upon the first set of content item text and the plurality of sets of content item text associated with the plurality of content items, a plurality of similarity scores associated with the plurality of sets of content item text, wherein:
the plurality of sets of content item text comprises a second set of content item text of a first content item of the plurality of content items; and
a first similarity score of the plurality of similarity scores is associated with a similarity between the first set of content item text and the second set of content item text; and selecting the set of content items from among the plurality of content items is based upon the plurality of similarity scores.

3. The method of claim 2, wherein:

selecting the set of content items from among the plurality of content items is based upon a determination that the set of content items are associated with highest similarity scores of the plurality of similarity scores.

4. The method of claim 2, comprising:

determining a first embedding-based representation of the first set of content item text, wherein the determining the plurality of similarity scores comprises determining the first similarity score based upon the first embedding-based representation and a second embedding-based representation of the second set of content item text of the first content item.

5. The method of claim 1, comprising:

determining embedding-based representations of the set of terms, wherein the similarity scores indicated by the similarity profile are based upon the embedding-based representations.

6. The method of claim 1, comprising:

analyzing the first set of content item text to identify one or more terms in the first set of content item text, wherein the one or more terms are included in the set of terms.

7. The method of claim 1, comprising:

translating the first set of content item text in a first language to a translated set of content item text in a second language; and
analyzing the translated set of content item text to identify one or more terms in the translated set of content item text, wherein the one or more terms are included in the set of terms.

8. The method of claim 1, comprising:

analyzing an image of a first content item of the set of content items to determine one or more object terms of one or more objects in the image, wherein the one or more object terms are included in the set of terms.

9. The method of claim 1, comprising:

analyzing sets of content item text associated with content items of the set of content items to identify one or more terms in the sets of content item text, wherein the one or more terms are included in the set of terms.

10. The method of claim 1, comprising:

determining, based upon a term of the set of terms and a content item category associated with the first set of content item text, a category bias associated with the term, wherein determining the relevance scores comprises determining a relevance score associated with the term based upon the category bias.

11. The method of claim 1, comprising:

determining embedding-based representations, of the set of terms, comprising:
a first embedding-based representation of a first term of the set of terms;
a second embedding-based representation of a second term of the set of terms; and
a third embedding-based representation of a third term of the set of terms;

determining a first measure of similarity between the first embedding-based representation and the second embedding-based representation; and determining a second measure of similarity between the first embedding-based representation and the third embedding-based representation.

12. The method of claim 11, comprising:

determining, for inclusion in the similarity profile, a first similarity score associated with a similarity between the first term and the second term based upon the first measure of similarity; and determining, for inclusion in the similarity profile, a second similarity score associated with a similarity between the first term and the third term based upon the second measure of similarity.

13. A computing device comprising:

a processor; and memory comprising processor-executable instructions that when executed by the processor cause performance of operations, the operations comprising:
receiving, from a client device, a first set of text;
selecting, based upon the first set of text and a plurality of sets of content item text associated with a plurality of content items, a set of content items from among the plurality of content items;
determining, based upon the first set of text and the set of content items, a set of terms;
generating a similarity profile associated with the set of terms, wherein the similarity profile is indicative of similarity scores associated with similarities between terms of the set of terms;
determining, based upon the similarity profile, relevance scores associated with the set of terms;
selecting, based upon the relevance scores, one or more search terms from among the set of terms;
performing a search based upon the one or more search terms;
sending, to the client device, a set of search results of the search;
receiving, from the client device, a selection of an image of a plurality of images in the set of search results;
responsive to the selection of the image, combining at least a portion of the image with the first set of text to generate a content item; and
at least one of presenting the generated content item to one or more other client devices or determining a target audience for the generated content item.

14. The computing device of claim 13, the operations comprising:

determining, based upon the first set of text and the plurality of sets of content item text associated with the plurality of content items, a plurality of similarity scores associated with the plurality of sets of content item text, wherein:

the plurality of sets of content item text comprises a first set of content item text of a first content item of the plurality of content items; and a first similarity score of the plurality of similarity scores is associated with a similarity between the first set of text and the first set of content item text; and selecting the set of content items from among the plurality of content items is based upon the plurality of similarity scores.

15. The computing device of claim 14, wherein:

selecting the set of content items from among the plurality of content items is based upon a determination that the set of content items are associated with highest similarity scores of the plurality of similarity scores.

16. The computing device of claim 13, the operations comprising:

determining embedding-based representations of the set of terms, wherein the similarity scores indicated by the similarity profile are based upon the embedding-based representations.

17. The computing device of claim 13, the operations comprising:

analyzing the first set of text to identify one or more terms in the first set of text, wherein the one or more terms are included in the set of terms.

18. The computing device of claim 13, the operations comprising:

translating the first set of text in a first language to a translated set of content item text in a second language; and analyzing the translated set of content item text to identify one or more terms in the translated set of content item text, wherein the one or more terms are included in the set of terms.

19. The computing device of claim 13, the operations comprising:

analyzing an image of a first content item of the set of content items to determine one or more object terms of one or more objects in the image, wherein the one or more object terms are included in the set of terms; and analyzing sets of content item text associated with content items of the set of content items to identify one or more terms in the sets of content item text, wherein the one or more terms are included in the set of terms.

20. A non-transitory machine readable medium having stored thereon processor-executable instructions that when executed cause performance of operations, the operations comprising:

displaying a content item creation interface via a client device;

receiving, via the content item creation interface, a first set of content item text;

selecting, based upon the first set of content item text and a plurality of sets of content item text associated with a plurality of content items, a set of content items from among the plurality of content items;

determining, based upon the first set of content item text and the set of content items, a set of terms;

determining embedding-based representations, of the set of terms, comprising:

a first embedding-based representation of a first term of the set of terms;

a second embedding-based representation of a second term of the set of terms; and a third embedding-based representation of a third term of the set of terms;

determining a first measure of similarity between the first embedding-based representation and the second embedding-based representation;

determining a second measure of similarity between the first embedding-based representation and the third embedding-based representation;

generating, based upon the first measure of similarity and the second measure of similarity, a similarity profile associated with the set of terms, wherein the similarity profile is indicative of similarity scores associated with similarities between terms of the set of terms;

determining, based upon the similarity profile, relevance scores associated with the set of terms;

selecting, based upon the relevance scores, one or more search terms from among the set of terms;

performing, based upon the one or more search terms, an image search using an image database;

displaying, via the content item creation interface, a set of search results of the image search;

receiving, via the content item creation interface, a selection of an image of a plurality of images in the set of search results; and responsive to the selection of the image, combining at least a portion of the image with the first set of content item text to generate a content item.

* * * * *